: US009019477B2

(12) United States Patent
Matsumoto et al.

(10) Patent No.: US 9,019,477 B2
(45) Date of Patent: Apr. 28, 2015

(54) LASER SCANNER AND METHOD FOR DETECTING MOBILE OBJECT

(75) Inventors: Masae Matsumoto, Itabashi-ku (JP); Tadayuki Ito, Itabashi-ku (JP); Ken-ichiro Yoshino, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 210 days.

(21) Appl. No.: 13/430,775

(22) Filed: Mar. 27, 2012

(65) Prior Publication Data

US 2012/0249997 A1    Oct. 4, 2012

(30) Foreign Application Priority Data

Mar. 29, 2011   (JP) .................................. 2011-071544

(51) Int. Cl.
| | | |
|---|---|---|
| *G01C 3/08* | (2006.01) | |
| *G01S 17/42* | (2006.01) | |
| *G01S 7/481* | (2006.01) | |
| *G01S 17/02* | (2006.01) | |
| *G01S 17/89* | (2006.01) | |
| *G01S 7/00* | (2006.01) | |

(Continued)

(52) U.S. Cl.
CPC ................ *G01S 17/42* (2013.01); *G01S 7/003* (2013.01); *G01S 7/4817* (2013.01); *G01S 7/497* (2013.01); *G01S 17/023* (2013.01); *G01S 17/10* (2013.01); *G01S 17/89* (2013.01)

(58) Field of Classification Search
CPC ........ G01C 3/08; G01C 15/002; G01S 17/89; G01S 7/4817; G01S 17/42
USPC .................... 356/3.01, 4.01, 9, 625
See application file for complete search history.

(56) References Cited

U.S. PATENT DOCUMENTS

| 4,775,236 | A | * | 10/1988 | Cohen et al. ................. 356/640 |
| 5,675,419 | A | * | 10/1997 | Van Den Bergh et al. .... 356/446 |
| 5,754,296 | A | * | 5/1998 | Law .............................. 356/369 |

(Continued)

FOREIGN PATENT DOCUMENTS

JP    2008-76303 A    4/2008

OTHER PUBLICATIONS

Topcon Corporation Catalogue, 2010, "GLS-1500: Compact, Operator-friendly Laser Scanner", 4 pages.

(Continued)

*Primary Examiner* — Luke Ratcliffe
*Assistant Examiner* — Samantha K Abraham
(74) *Attorney, Agent, or Firm* — Nields, Lemack & Frame, LLC

(57) ABSTRACT

A laser scanner comprises a light projecting optical system for projecting a distance measuring light, a deflecting optical member for deflecting and projecting the distance measuring light to a measurement area, a distance measuring unit for carrying out measurement based on a reflection light and for acquiring distance data of the measurement area, a second image pickup unit capable of continuously acquiring image data including the measurement area, and a control unit. The control unit has a first image processing unit for acquiring a three-dimensional image based on the image data and on the distance data, and also has a second image processing unit for detecting a mobile object by comparing image data being adjacent to each other in terms of time. The control unit controls the distance measuring unit so that measurement of the mobile object detected in the measurement area is restricted by the second image processing unit.

14 Claims, 14 Drawing Sheets

(51) Int. Cl.
  *G01S 7/497* (2006.01)
  *G01S 17/10* (2006.01)

(56) References Cited

U.S. PATENT DOCUMENTS 6,330,523 B1    12/2001  Kacyra et al.
6,931,146 B2 *   8/2005  Aoki et al. .................... 382/107
2007/0242860 A1 * 10/2007  Hasebe et al. ................ 382/118
2008/0075325 A1   3/2008  Otani et al.
2009/0119050 A1   5/2009  Hayashi
2010/0296705 A1  11/2010  Miksa et al.

OTHER PUBLICATIONS

European communication dated May 28, 2014 in corresponding European patent application No. EP 12161519.9.

* cited by examiner

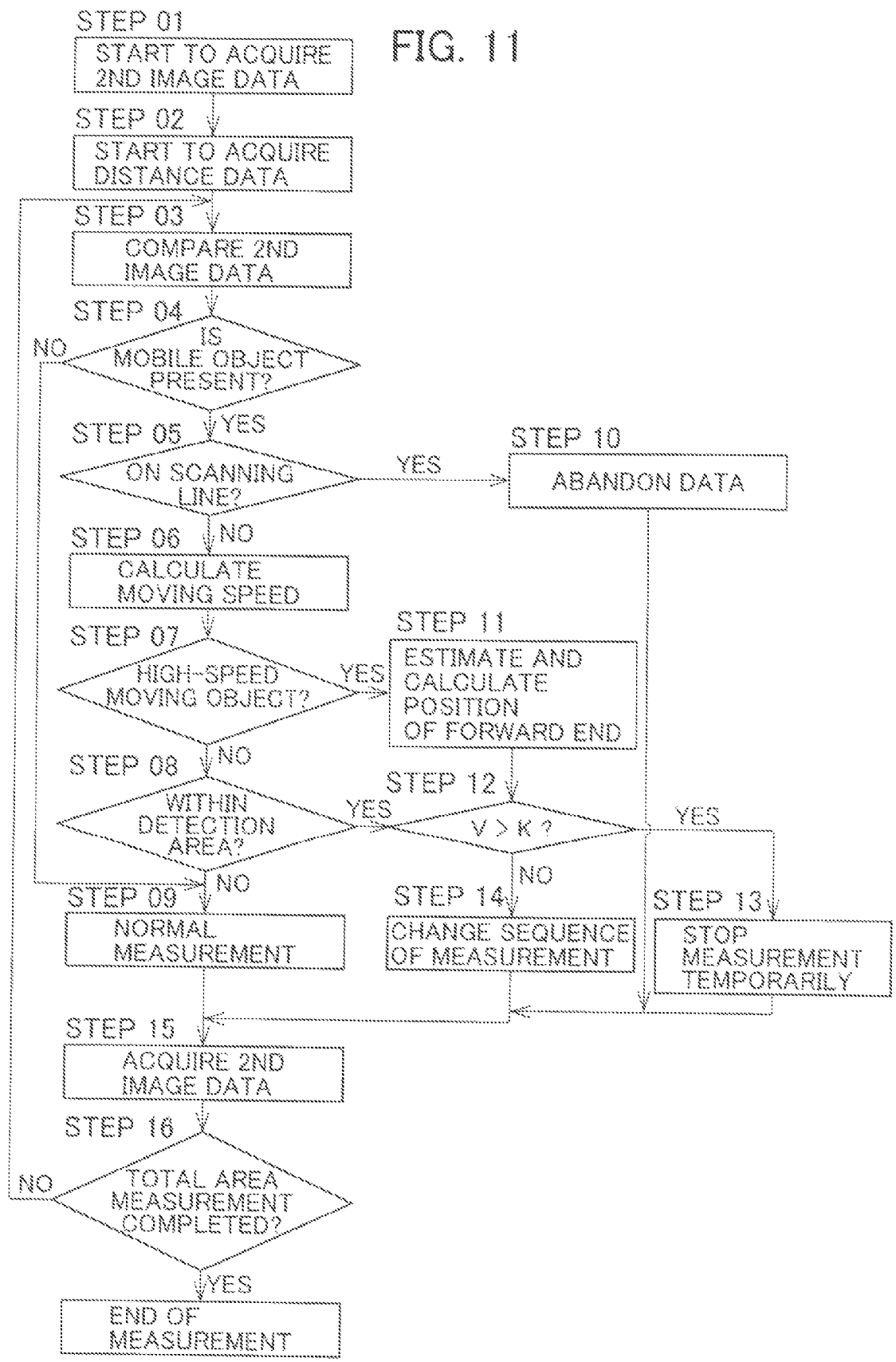

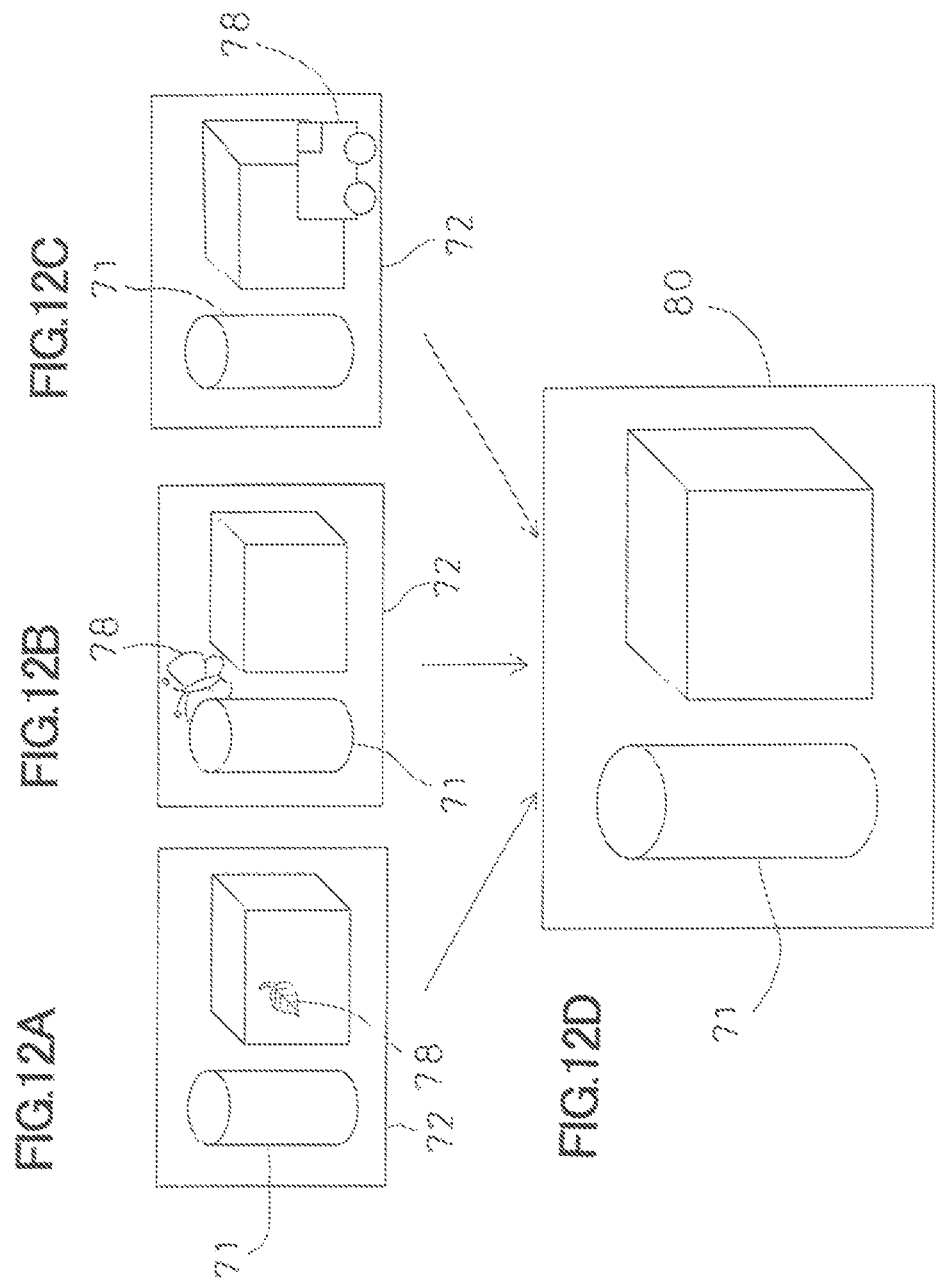

LASER SCANNER AND METHOD FOR DETECTING MOBILE OBJECT

BACKGROUND OF THE INVENTION

The present invention relates to a laser scanner and a method for detecting a mobile object which acquire three-dimensional data of an object to be measured by projecting a distance measuring light to the object to be measured, by receiving a reflection light from the object to be measured, by measuring a distance to the object to be measured and further, by detecting a projecting direction of the distance measuring light at the time of measurement.

In the past, a three-dimensional measuring system, i.e. the so-called laser scanner, has been known, which projects pulsed laser beams such as infrared lights or the like and scans over an object to be measured such as building, road, etc, carries out distance measurement based on a reflection light from the object to be measured, carries out three-dimensional measurement of the object to be measured from a measured distance value and from a projecting angle, and acquires point group data.

The laser scanner as described above acquires three-dimensional point group data calculated from the measured distance value and from the projecting angle of the pulsed beam. Also, there is a type of the laser scanner, by which image data of the object to be measured is acquired in advance before the acquisition of point group data, and three-dimensional data with image are acquired by associating these image data with the point group data.

However, when measurement is performed on building, road, etc. by using a laser scanner, and if a mobile object such as a pedestrian, an automobile, or the like is present in a measurement area, measurement is also performed on the mobile object, and measurement data of the mobile object are intermingled as noise in three-dimensional coordinate data. Therefore, it has been necessary in the past that an operator of the laser scanner had to monitor the measurement area and position of the mobile object at all times and to manually carry out temporary stopping and resuming of the scanning when the mobile object enters into the measurement area.

SUMMARY OF THE INVENTION

It is an object of the invention to provide a laser scanner and a method for detecting a mobile object, according to which it is possible to improve working efficiency by automatically preventing the intermingling of the measurement data of the mobile object into three-dimensional data.

To attain the above object, a laser scanner according to the present invention comprises a light projecting optical system for projecting a distance measuring light along a projection optical axis, a deflecting optical member for deflecting and projecting the distance measuring light to a measurement area, an elevation angle driving unit for rotating the deflecting optical member in elevation direction, a horizontal angle driving unit for rotating the deflecting optical member in horizontal direction, a distance measuring unit for carrying out measurement based on a reflection light of the distance measuring light and for acquiring distance data of the measurement area, a second image pickup unit capable of continuously acquiring image data including the measurement area, and a control unit, and in the laser scanner, the control unit has a first image processing unit for acquiring a three-dimensional image based on the image data and on the distance data, and also has a second image processing unit for detecting a mobile object by comparing image data being adjacent to each other in terms of time, and the control unit controls the distance measuring unit so that measurement of the mobile object detected in the measurement area is restricted by the second image processing unit.

Further, in the laser scanner according to the present invention, the control unit makes the distance measuring unit temporarily stop measurement of the measurement area when the mobile object is detected within the measurement area, and also makes the distance measuring unit start the measurement again after it is confirmed that the mobile object is not present within the measurement area by the second image processing unit. Further, in the laser scanner according to the present invention, when the mobile object is detected within the measurement area, the control unit makes the distance measuring unit change sequence of measurement so that the measurement in the measurement area is performed from a point where the mobile object has not been detected by the second image processing unit. Further, in the laser scanner according to the present invention, when the mobile object is detected within the measurement area, the control unit abandons distance data of the mobile object measured by the distance measuring unit and makes the distance measuring unit start the measurement in the measurement area again from a point where the distance data has been abandoned.

Further, the laser scanner according to the present invention further comprises a first image pickup unit for taking an image via the deflection optical member, and the first image pickup unit acquires panoramic image data based on image data as taken by the second image pickup unit, and the measurement area is set up based on the panoramic image data.

Further, in the laser scanner according to the present invention, the light projecting optical system has a zoom beam expander for minimizing diameter of luminous fluxes of the distance measuring light, depending on a measurement distance to the measurement area.

Further, the laser scanner according to the present invention further comprises a first image pickup unit for taking images via the deflection optical member, and in the laser scanner, two or more panoramic image data are acquired by synthesizing two or more image data as taken by two or more times respectively by the first image pickup unit, the mobile object is detected by comparing the two or more panoramic image data with each other, and reference image data for detecting the mobile object are acquired by deleting the mobile object. Further, in the laser scanner according to the present invention, the mobile object is detected by comparing the reference image data with the image data as taken by the second image pickup unit. Further, in the laser scanner according to the present invention, the second image processing unit detects the mobile object by comparing image data adjacent to each other based on deviation of color information and/or brightness information. Further, in the laser scanner according to the present invention, a detection area is formed to perform a predetermined mobile object evasion processing in the measurement area, and the detection area is enlarged or reduced according to distance measuring speed determined by the distance measuring unit. Further, in the laser scanner according to the present invention, the control unit calculates moving speed of the mobile object based on time interval of acquisition of the image data and on horizontal moving speed of the deflection optical member and restricts measurement of the mobile object by the distance measuring unit based on moving speed of the mobile object and on position of the mobile object within the measurement area.

Further, a method for detecting a mobile object according to the present invention comprises a step of setting up a measurement area, a step of performing measurement by a distance measuring unit based on a reflection light of a distance measuring light projected from a light projecting optical system and of acquiring distance data of the measurement area, and a step of acquiring image data by continuously taking images on the measurement area by a second image pickup unit in parallel with the step of acquiring distance data and of detecting a mobile object by extracting difference between image data adjacent to each other in terms of time.

Further, in the method for detecting the mobile object according to the present invention, the measurement area is set up based on image data as taken by a first image pickup unit via a deflection optical member. Furthermore, in the method for detecting the mobile object according to the present invention, the measurement area is set up based on image data as taken by the second image pickup unit.

According to the present invention, a laser scanner comprises a light projecting optical system for projecting a distance measuring light along a projection optical axis, a deflecting optical member for deflecting and projecting the distance measuring light to a measurement area, an elevation angle driving unit for rotating the deflecting optical member in elevation direction, a horizontal angle driving unit for rotating the deflecting optical member in horizontal direction, a distance measuring unit for carrying out measurement based on a reflection light of the distance measuring light and for acquiring distance data of the measurement area, a second image pickup unit capable of continuously acquiring image data including the measurement area, and a control unit, and in the laser scanner, the control unit has a first image processing unit for acquiring a three-dimensional image based on the image data and on the distance data, and also has a second image processing unit for detecting a mobile object by comparing image data being adjacent to each other in terms of time, and the control unit controls the distance measuring unit so that measurement of the mobile object detected in the measurement area is restricted by the second image processing unit. As a result, it is possible to automatically detect the mobile object in the measurement area, and there is no need for an operator to visually confirm the measurement area and to stop and start again the measurement manually when the mobile object is detected. Therefore, working efficiency can be improved.

Further, according to the present invention, in the laser scanner, the control unit makes the distance measuring unit temporarily stop measurement of the measurement area when the mobile object is detected within the measurement area, and also makes the distance measuring unit start the measurement again after it is confirmed that the mobile object is not present within the measurement area by the second image processing unit. As a result, the distance measuring unit does not acquire distance data of the mobile object.

Further, according to the present invention, in the laser scanner, when the mobile object is detected within the measurement area, the control unit makes the distance measuring unit change sequence of measurement so that the measurement in the measurement area is performed from a point where the mobile object has not been detected by the second image processing unit. As a result, it is possible to shorten the time required for measurement of the measurement area.

Further, according to the present invention, in the laser scanner, when the mobile object is detected within the measurement area, the control unit abandons distance data of the mobile object measured by the distance measuring unit and makes the distance measuring unit start the measurement in the measurement area again from a point where the distance data has been abandoned. As a result, even in a case where the distance data of the mobile object is acquired, the distance data of the mobile object is not reflected in the three-dimensional image to be processed by the first image processing unit.

Further, according to the present invention, the laser scanner further comprises a first image pickup unit for taking an image via the deflection optical member, and the first image pickup unit acquires panoramic image data based on image data as taken by the second image pickup unit, and the measurement area is set up based on the panoramic image data. As a result, an operator has no need to manually acquire the panoramic image, and working efficiency can be improved.

Further, according to the present invention, the laser scanner further comprises a first image pickup unit for taking images via the deflection optical member, and in the laser scanner, two or more panoramic image data are acquired by synthesizing two or more image data as taken by two or more times respectively by the first image pickup unit, the mobile object is detected by comparing the two or more panoramic image data with each other, and reference image data for detecting the mobile object are acquired by deleting the mobile object. As a result, even in a case where the mobile object is present at the time of image pickup, it is possible to automatically acquire the image data where no mobile object is present.

Further, according to the present invention, in the laser scanner, the mobile object is detected by comparing the reference image data with the image data as taken by the second image pickup unit. As a result, the object for comparison with the image data as taken by the second image pickup unit is always the same, and the burden on the processing is reduced.

Further, according to the present invention, in the laser scanner, the second image processing unit detects the mobile object by comparing image data adjacent to each other based on deviation of color information and/or brightness information. As a result, the operator can automatically detect the mobile object without comparing between the image data themselves.

Further, according to the present invention, in the laser scanner, a detection area is formed to perform a predetermined mobile object evasion processing in the measurement area, and the detection area is enlarged or reduced according to distance measuring speed determined by the distance measuring unit. As a result, it is possible to prevent the intermingling of distance data of the mobile object into the distance data.

Further, according to the present invention, in the laser scanner, the control unit calculates moving speed of the mobile object based on time interval of acquisition of the image data and on horizontal moving speed of the deflection optical member and restricts measurement of the mobile object by the distance measuring unit based on moving speed of the mobile object and on position of the mobile object within the measurement area. As a result, it is possible to prevent the intermingling of distance data of the mobile object into the distance data.

Furthermore, according to the present invention, a method for detecting a mobile object comprises a step of setting up a measurement area, a step of performing measurement by a distance measuring unit based on a reflection light of a distance measuring light projected from a light projecting optical system and of acquiring distance data of the measurement area, and a step of acquiring image data by continuously taking images on the measurement area by a second image pickup unit in parallel with the step of acquiring distance data and of detecting a mobile object by extracting difference between image data adjacent to each other in terms of time. As a result, presence or absence of the mobile object can be

BRIEF DESCRIPTION OF THE DRAWINGS

FIG. 5A shows a condition where height of a measurement area is set at a low position, and FIG. 5B shows a condition where height of the measurement area is set at a high position;

FIG. 7A shows a second image data acquired previously, FIG. 7B shows the second image data newly acquired, and FIG. 7C shows a condition where the mobile object is detected by comparing FIG. 7A with FIG. 7B;

FIG. 8A shows a second image data acquired previously, FIG. 8B shows the second image data newly acquired, and FIG. 8C shows the second image data to be acquired next time;

FIG. 9A shows a condition where the mobile object is detected in a measurement area, FIG. 9B shows a condition where order of measurement is changed according to detection of the mobile object, and FIG. 9C shows a condition where the measurement is stopped;

FIG. 10A shows a normal condition of measurement on the measurement area, FIG. 10B shows a condition where the mobile object suddenly appears on a scanning line, FIG. 10C shows a condition where the mobile object is scanned, and FIG. 10D shows a condition where an area where the mobile object is scanned is abandoned;

FIG. 11 is a flow chart to show a flow of detection and evasion of the mobile object in the first embodiment;

FIG. 12A, FIG. 12B, FIG. 12C and FIG. 12D are illustrative drawings to show an example of a method for preparing a reference image data. FIG. 12A shows one of the first image data as taken by two or more times, FIG. 12B shows one of the first image data as taken by two or more times, FIG. 12C shows one of the first image data as taken by two or more times, and FIG. 12D shows the first image data when the mobile object is deleted, depending on difference in FIG. 12A to FIG. 12C;

DETAILED DESCRIPTION OF THE PREFERRED EMBODIMENTS

Description will be given below on embodiments of the present invention by referring to the attached drawings.

First, description will be given on the laser scanner, to which the present invention is applied.

Figure 1:
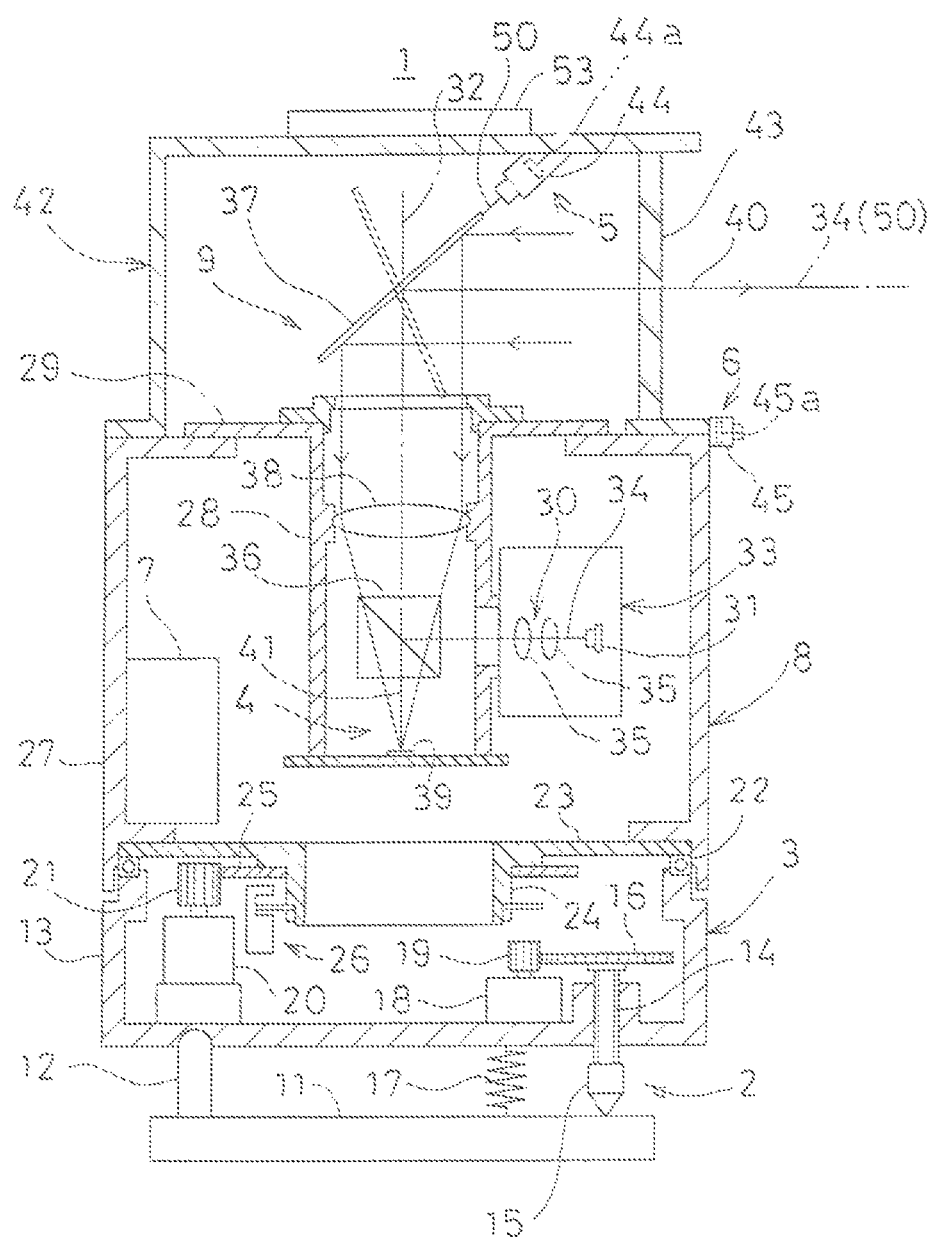
FIG. 1 is a schematical cross-sectional view of a laser scanner according to a first embodiment of the present invention.
Figure 2:
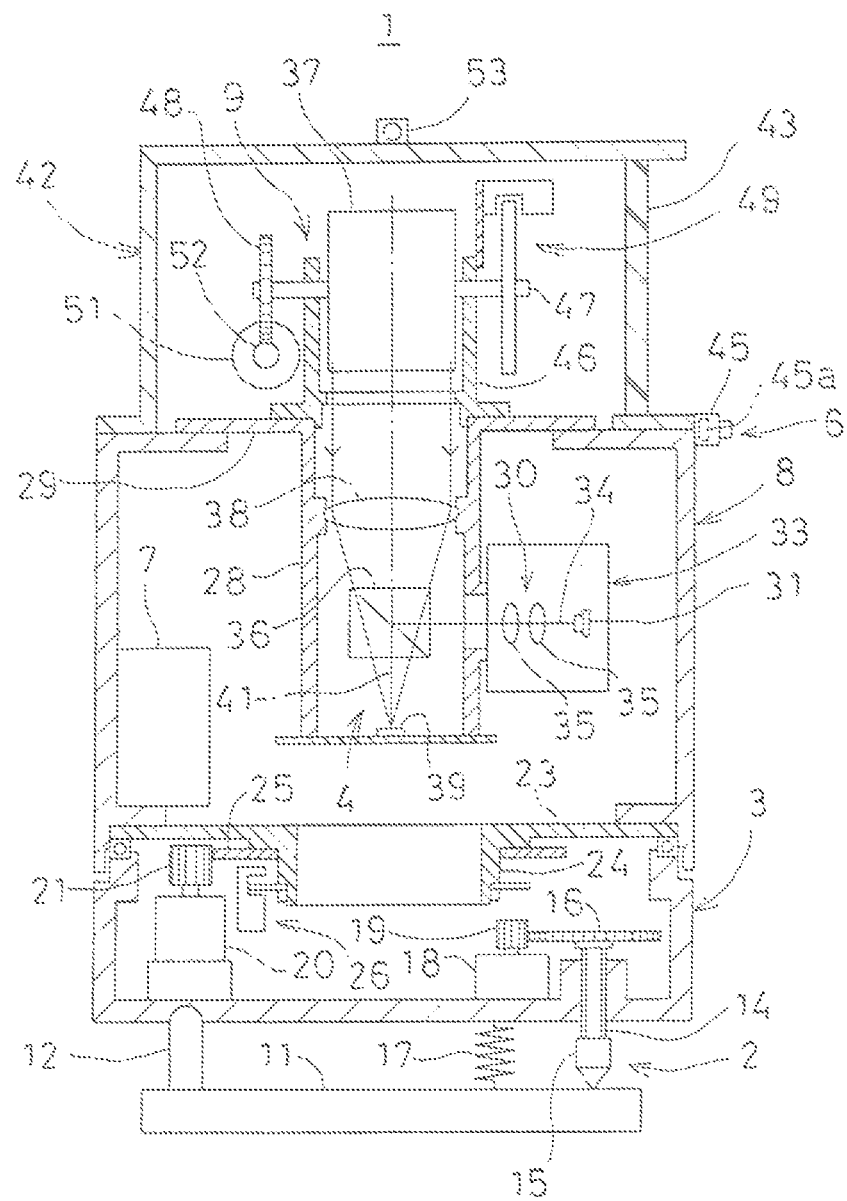
FIG. 2 is a schematical cross-sectional view of the laser scanner when a part of the laser scanner is rotated according to the first embodiment of the present invention.
Figure 3:
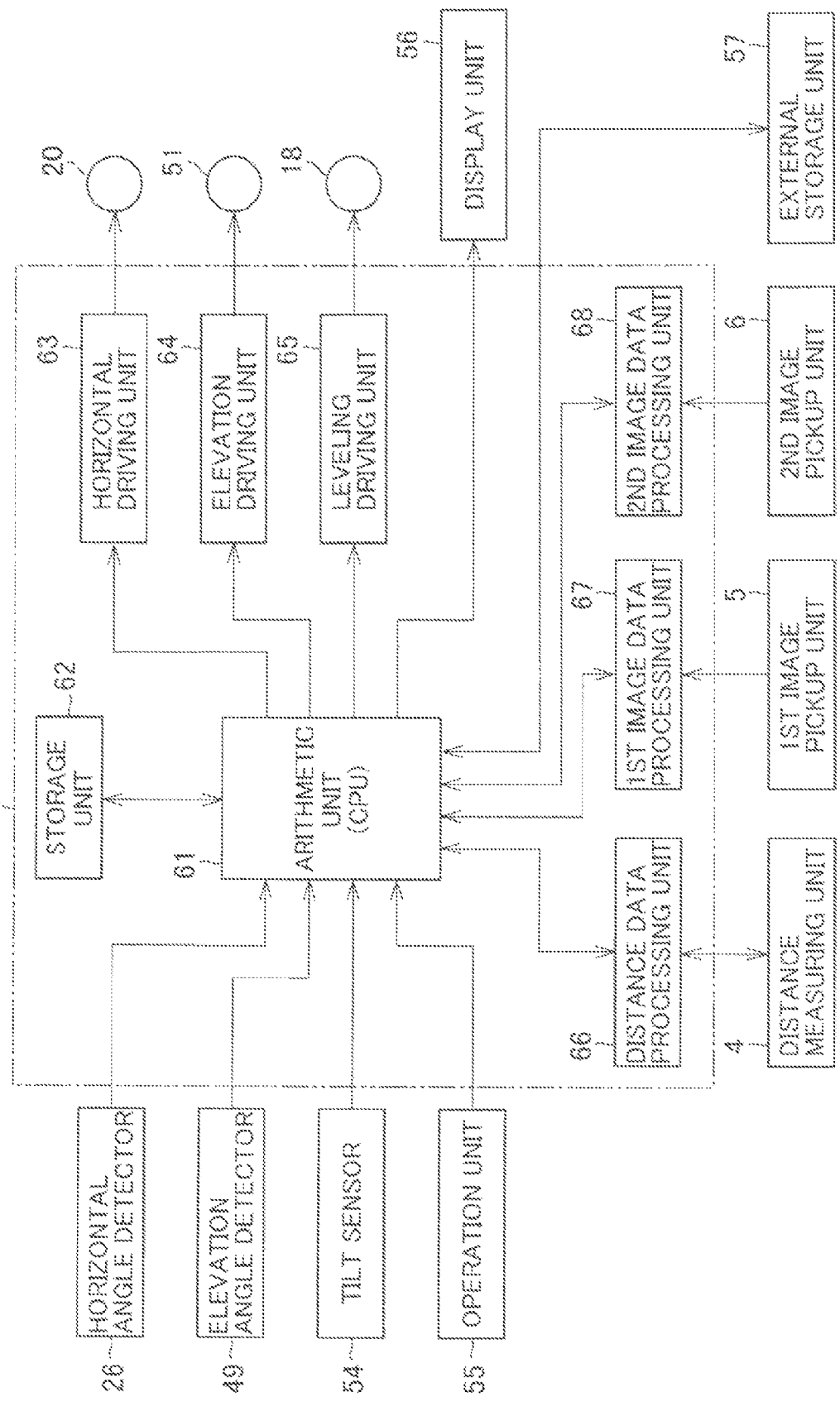
FIG. 3 is a schematical block diagram to show an arrangement of the laser scanner according to the first embodiment of the present invention.

FIG. 1 to FIG. 3 each represents a laser scanner according to a first embodiment.

A laser scanner 1 primarily comprises a leveling unit 2, a rotary mechanism unit 3 installed on the leveling unit 2, a measuring instrument main unit 8 which is supported by the rotary mechanism unit 3 and includes a distance measuring unit 4, a first image pickup unit 5, a second image pickup unit 6, a control unit 7, etc., and a rotary projecting unit 9 installed on upper portion of the measuring instrument main unit 8. FIG. 2 shows a condition where only the rotary projecting unit 9 is seen from lateral direction with respect to FIG. 1 for convenience purpose.

Now, description will be given on the leveling unit 2.

A pin 12 is erected on a base unit 11. An upper end of the pin 12 is designed as a curved surface, and the upper end is tiltably engaged with a recessed portion formed on a bottom surface of a lower casing 13. At each of two other points of the bottom surface, an adjusting screw 14 is screwed in and penetrating through respectively, and a leg member 15 is fixedly attached at a lower end portion of the adjusting screws 14. A lower end of the leg members 15 is designed with a pointed end or with a curved surface and abuts on the base unit 11. A leveling driven gear 16 is attached and engaged with upper end of the adjusting screw 14. The lower casing 13 is supported on the base unit 11 at three points, i.e. by the pin 12 and by the two adjusting screws 14, so that the lower casing 13 can be tilted with a forward end of the pin 12 as the center. A spring 17 is provided between the base unit 11 and the lower casing 13 so that the base unit 11 may not be separated from the lower casing 13.

Inside the lower casing 13, two leveling motors 18 are disposed. A leveling driving gear 19 is attached and engaged with output shaft of the leveling motor 18, and the leveling driving gear 19 is engaged with the leveling driven gear 16. The leveling motor 18 is independently driven by the control unit 7. The adjusting screw 14 is rotated by the driving operation of the leveling motor 18 via the leveling driving gear 19 and the leveling driven gear 16 so that an amount of projection downward of the adjusting screws 14 can be adjusted. Inside the lower casing 13, a tilt sensor 54 (see FIG. 3) is mounted. When two leveling motors 18 are driven according to a detection signal of the tilt sensor 54, leveling of the leveling unit 2 is carried out.

Next, description will be given on the rotary mechanism unit 3.

The lower casing 13 also fulfills the function as a casing of the rotary mechanism unit 3. A horizontal rotating motor 20 is installed inside the lower casing 13, and a horizontal rotary driving gear 21 is attached and engaged on output shaft of the horizontal rotating motor 20.

On an upper end of the lower casing 13, a rotary base 23 is provided via a bearing 22. At the center of the rotary base 23, a rotation axis 24 protruding downward is provided. A horizontal rotary gear 25 is mounted on the rotation axis 24, and the horizontal driving gear 21 is engaged with the horizontal rotary gear 25. The horizontal rotating motor 20, the horizontal rotary driving gear 21, and the horizontal rotary gear 25, etc. make up together a horizontal angle driving unit.

A horizontal angle detector 26, e.g. an encoder, is mounted on the rotation axis 24. By the horizontal angle detector 26, a relative rotation angle of the rotation axis 24 with respect to the lower casing 13 is detected. Detection result (i.e. horizontal angle) is inputted to the control unit 7. Based on the detection result, driving of the horizontal rotating motor 20 is controlled by the control unit 7.

Next, description will be given on the measuring instrument main unit 8.

A main unit casing 27 is fixedly attached on the rotary base 23, and a body tube 28 is installed inside the main unit casing 27. The body tube 28 has a central axis 32 concentric to the rotation center of the main unit casing 27, and the body tube 28 is mounted on the main unit casing 27 by the means as required. For instance, a flange 29 is formed on an upper end of the body tube 28, and the flange 29 is fixedly attached on ceiling portion of the main unit casing 27.

On a lateral side of the body tube 28, a light emitting unit 33 is installed, which constitutes a light projecting optical system. The light emitting unit 33 comprises a light emitting element 31 to emit pulsed laser beams and a plurality of lenses 35 (In the figure, lenses are shown in simpler arrangement.) provided on a projection optical axis 34 of the light emitting element 31. A zoom beam expander 30 is made up by the plurality of lenses 35. A semiconductor laser or the like is used as the light emitting element 31, for instance. The light emitting element 31 emits infrared pulsed laser beams as a distance measuring light 40, and the light emitting element 31 is controlled by the control unit 7 so that the pulsed laser beams are emitted in such condition as required.

A half-mirror 36 is disposed at a position where the projection optical axis 34 crosses the central axis 32. The pulsed laser beams (the distance measuring light 40) emitted from the light emitting element 31 are turned to parallel beams through the lens 35. After diameter of luminous fluxes of the distance measuring light 40 is minimized by the zoom beam expander 30, the luminous fluxes are reflected by the half-mirror 36 so that the luminous fluxes are to be coincident with the central axis 32. The distance measuring light 40 thus reflected passes through an elevation rotary mirror 37 and is projected toward the object to be measured along the projection optical axis 34. The elevation rotary mirror 37 is a deflection optical member, and is positioned along the central axis 32, and a condenser lens 38 is arranged on the central axis 32 between the half-mirror 36 and the elevation rotary mirror 37. The elevation rotary mirror 37 deflects the projection optical axis 34, which is deflected in vertical direction by the half-mirror 36, further in horizontal direction.

A distance measuring photodetector (light receiving unit) 39 is provided at a bottom portion of the body tube 28 on the central axis 32, and the distance measuring photodetector 39 is positioned along a photodetection optical axis 41, which passes through the half-mirror 36. A reflected distance measuring light reflected from the object to be measured enters the distance measuring light photodetector 39 via the elevation rotary mirror 37, the condenser lens 38 and the half-mirror 36. It is so arranged that a part of the distance measuring light enters the distance measuring photodetector 39 as an internal reference light (not shown), and a distance to the object to be measured is determined according to the reflected distance measuring light and the internal reference light.

The light emitting element 31, the lens 35, the half-mirror 36, the elevation rotary mirror 37, the condenser lens 38, the distance measuring light photodetector 39, etc. make up together the distance measuring unit 4.

An upper casing 42 is provided on the upper side of the main unit casing 27, and a part of side wall of the upper casing 42 is designed as a light projection window 43.

On a lower surface of ceiling of the upper casing 42, a narrow-angle camera (hereinafter referred as "panoramic camera") 44 having narrow field angle is mounted. This panoramic camera 44 is a digital camera, which has an image photodetector 44a (e.g. CCD or CMOS sensor) where a multiple number of pixels are put together on a planar arrangement. Positions of all pixels of the image photodetector 44a are specified around an image pickup optical axis 50 running perpendicularly to the image photodetector 44a. For instance, X-Y coordinates are assumed with the optical axis as the origin, and positions of pixels are specified by X-coordinate and Y-coordinate.

An angle of the laser beam entering the image photodetector 44a (i.e. an angle with respect to the image pickup optical axis 50) is determined by the position of pixel of the image photodetector 44a, and the angle is represented as a field angle. The panoramic camera 44, the elevation rotary mirror 37, etc. make up together the first image pickup unit 5.

The image pickup optical axis 50 of an image pickup light from the object to be measured coincides with the projection optical axis 34. By rotating the elevation rotary mirror 37 at a predetermined angle, the image pickup optical axis 50 can be deflected, and the image pickup optical axis 50 after the deflection can be made coincident with the optical axis of the panoramic camera 44. When an image of the object to be measured is taken by the panoramic camera 44, the elevation rotary mirror 37 is rotated at the predetermined angle. The image pickup light from the object to be measured is reflected by the elevation rotary mirror 37 so that the image pickup light enters the panoramic camera 44. The image pickup light thus entered is received by the image photodetector 44a, and an image is acquired.

The first image pickup unit 5 rotates the elevation rotary mirror 37 and acquires an image of the object to be measured at an angle different from the distance measurement condition of the elevation rotary mirror 37. Therefore, distance measurement by the distance measuring unit 4 and acquisition of the image by the first image pickup unit 5 are executed alternatively.

At a position lower than the light projection window 43 on a side wall of the main unit casing 27, a wide angle camera 45 capable of taking an image of digital moving picture is installed. Image pickup optical axis of the wide angle camera 45 is positioned on the same plane (vertical plane) as the projection optical axis 34 and the image pickup optical axis 50 and is running in parallel to the projection optical axis 34 and the image pickup optical axis 50. The wide angle camera 45 is so designed that the moving picture of the object to be measured can be taken simultaneously with the measurement of the distance to the object to be measured by the distance measuring unit 4, and the wide angle camera 45 fulfills the function as the second image pickup unit 6.

Next, description will be given on the rotary projecting unit 9.

The rotary projecting unit 9 is accommodated inside the upper casing 42. A mirror holder 46 is mounted on an upper end of the flange 29, and the elevation rotary mirror 37 is rotatably disposed on the mirror holder 46 via a horizontal rotation shaft 47. An elevation rotary gear 48 is attached and engaged on one of shaft ends of the elevation rotary mirror 37, and an elevation angle detector 49 is arranged on the other shaft end of the elevation rotary mirror 37. The elevation angle detector 49 detects rotating angle (rotating position) of the elevation rotary mirror 37 so that detection result will be sent to the control unit 7.

An elevation rotating motor 51 is mounted on the mirror holder 46, and an elevation rotary driving gear 52 is attached and engaged on an output shaft of the elevation rotating motor 51, and the elevation rotary driving gear 52 is engaged with the elevation rotary gear 48. The elevation rotating motor 51 is so designed that driving can be controlled by the control unit 7 based on detection result of the elevation angle detector 49. The control unit 7 can control driving of the horizontal rotating motor 20 and the elevation rotating motor 51 independently or synchronizingly. The elevation rotary gear 48, the elevation rotating motor 51, the elevation rotary driving gear 52, etc. make up together an elevation angle driving unit.

On upper surface of the upper casing 42, a coarse sight 53 is provided. Sighting direction of the coarse sight 53 perpendicularly crosses the projection optical axis 34 (i.e. the central axis 32) in a vertical direction, and also perpendicularly crosses the rotation shaft 47.

Next, referring to FIG. 3, description will be given on a configuration of control system of the laser scanner 1.

Detection signals from the horizontal angle detector 26, the elevation angle detector 49 and the tilt sensor 54 are inputted to the control unit 7 and an operator can input the conditions necessary for starting the measurement of the laser scanner 1 and an instruction to start the measurement or the like from an operation unit 55. The operation unit 55 may be disposed on a casing such as the main unit casing 27 or the like, or may be separately and independently provided. In a case where the operation unit 55 is separately provided, it may be so arranged that remote control operation can be accomplished by the operation unit 55 via signal transmission media such as wireless means, infrared light, etc.

The control unit 7 controls driving of the horizontal rotating motor 20, the elevation rotating motor 51, and the leveling motor 18, and also controls driving of a display unit 56, which displays operating conditions, measurement results, etc. An external storage unit 57 such as a memory card, HDD, etc. is mounted or removably attached on the control unit 7.

Now, description will be given on general features of the control unit 7.

The control unit 7 has an arithmetic unit 61 typically represented by CPU, a storage unit 62 for storing various types of programs and data such as measurement data, image data, etc. The various types of programs include a sequence program necessary for performing distance measurement, for detecting elevation angle and for detecting horizontal angle, an arithmetic program, a measurement data processing program for executing processing of measurement data, an image processing program for performing image processing, a mobile object detecting program for detecting the mobile object by comparing image data as acquired adjacent to each other in terms of time, a moving speed calculating program for calculating speed of the mobile object based on displacement obtained through comparison, a mobile object evasion processing program for performing evasion processing to match the mobile object when the mobile object is detected, an evasion processing selecting program for selecting one of processings among a plurality of mobile object evasion processings according to position and speed of the detected mobile object, an image display program for displaying data on the display unit 56, and other programs, or a program for integrally managing these programs.

The control unit 7 comprises a horizontal driving unit 63 for driving and controlling the horizontal rotating motor 20, an elevation driving unit 64 for driving and controlling the elevation rotating motor 51, a leveling driving unit 65 for driving and controlling the leveling motor 18, a distance data processing unit 66 for processing distance data acquired by the distance measuring unit 4, a first image data processing unit 67 for acquiring three-dimensional image data based on a first image data 72 (to be described later) as acquired by the first image pickup unit 5 and based on the distance data, and a second image data processing unit 68 for detecting the mobile object based on a second image data 77 (to be described later) as acquired by the second image pickup unit 6 and other units.

The functions of the distance data processing unit 66, the first image data processing unit 67 and the second image data processing unit 68 may be executed by the arithmetic unit 61. In this case, the distance data processing unit 66, the first image data processing unit 67, and the second image data processing unit 68 can be omitted. By separately providing the distance data processing unit 66, the first image data processing unit 67, and the second image data processing unit 68, it is possible to carry out distance data processing and image data processing in parallel to each other, and high-speed processing can be carried out.

The distance data processing unit 66, the first image data processing unit 67, and the second image data processing unit 68 may be separately provided. For instance, it may be so arranged that a personal computer (PC) is separately provided so that the functions of the distance data processing unit 66, the first image data processing unit 67, and the second image data processing unit 68 are executed by the PC. In this case, it may be so arranged that distance data, the first image data 72, and the second image data 77 are stored in the external storage unit 57, and after storing, the external storage unit 57 may be removed from the control unit 7 and be connected to the PC so that distance data processing, the first image data processing, and the second image data processing can be executed by the PC. Data acquired by the laser scanner 1 can be transmitted to the PC by communication means as required such as wireless LAN or the like. In this case, there is no need to design the external storage unit 57 as removable or the external storage unit 57 may be omitted.

Figure 4:
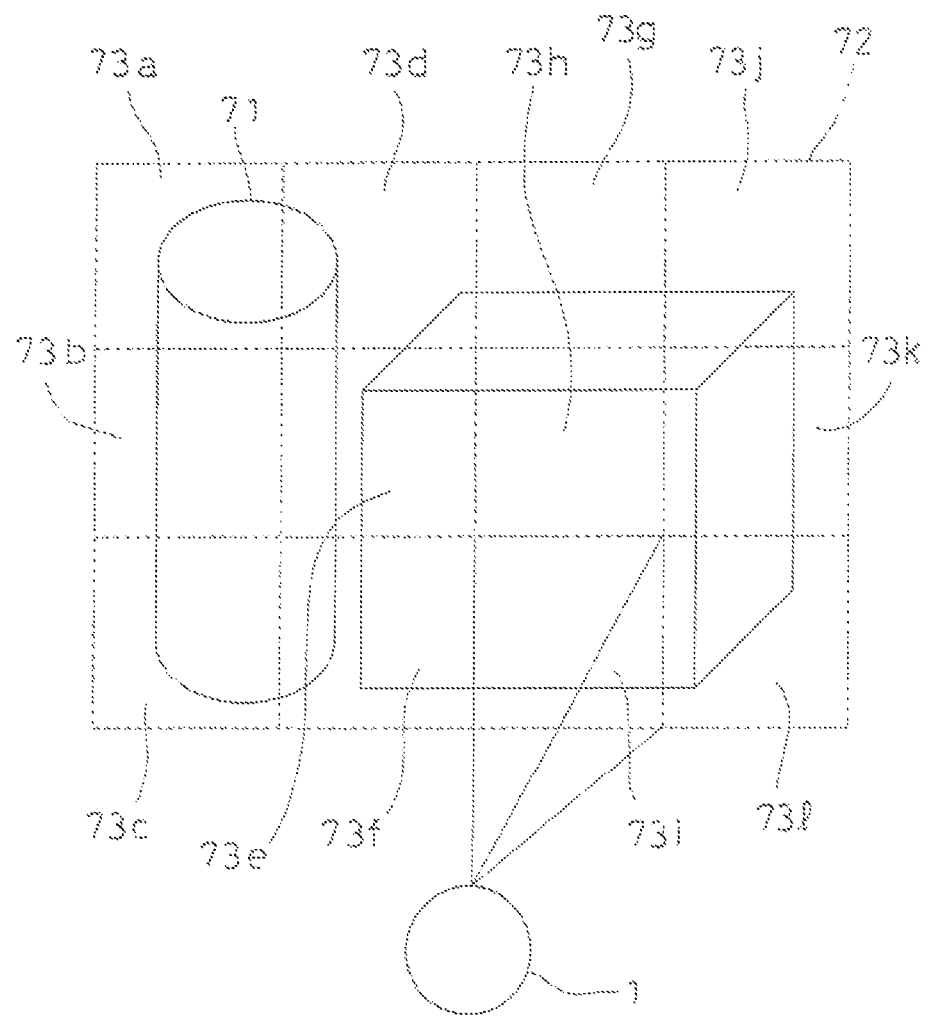
FIG. 4 is an illustrative drawing to show acquisition of data in the first embodiment.

Next, referring to FIG. 4, FIG. 5A and FIG. 5B, description will be given on measurement operation by the laser scanner 1 and on acquisition of image data and distance data of the object to be measured.

The laser scanner 1 is installed at a known point. Leveling is specified by the operation unit 55 and leveling operation is carried out.

The leveling motor 18 is driven via the leveling driving unit 65. Tilting of the laser scanner 1 is detected by the tilt sensor 54, and detection result of the tilt sensor 54 is sent to the control unit 7 by feedback. The adjusting screws 14 are rotated by the leveling motor 18 so that the tilt sensor 54 can detect the horizontal direction.

When leveling operation is completed, display of leveling completion is given on the display unit 56, or the leveling completion is announced by means such as alarm sound or the like.

When leveling operation is completed, sighting is performed via the coarse sight 53, and measurement range is set up. For instance, if the measurement range is in rectangular form, four corners of the measurement range is sighted by the coarse sight 53. By setting each sighting direction (horizontal angle and elevation angle), the measurement range can be set up.

Or, by designing the display unit 56 as a touch panel, the image acquired by the panoramic camera 44 is displayed on the display unit 56, and the measurement range can be set up on the image by the touch panel. In a case where the measurement range is wider than a single image acquired by the panoramic camera 44, a plurality of images as taken by the panoramic camera 44 are synthesized as to be described later. Then, the first image data 72, which is a panoramic image, is prepared. Then, the first image data 72 is displayed on the display unit 56, and the measurement range can be set up on the panoramic image.

Following description will be given now on a case where the measurement range is set up according to the first image data 72.

The first image data 72 can be acquired by taking the image by means of the first image pickup unit 5. In a case where the measurement range to be set up exceeds the range of a single image pickup operation, the image pickup is performed by dividing the measurement range (In the figure, the measurement range is divided into 12 parts). In a case where a divided image is taken by dividing the measurement range, the divided image is taken so that the portions as required are overlapped on each other between the divided image data adjacent to each other for the purpose of synthesizing the divided image data taken by dividing.

By the fact that the measurement range, a range of a single image pickup operation, and an amount of overlapping are set up, when the divided image pickup is performed the necessary conditions are calculated by the arithmetic unit 61. For instance, number of divisions for image pickup, rotation angle to rotate the measuring instrument main unit 8 for each image pickup operation, image pickup direction of the measuring instrument main unit 8, rotation angle of the elevation rotary mirror 37, elevation angle of the elevation rotary mirror 37, etc. are calculated.

When an instruction to acquire the first image data 72 is given by the operation unit 55, posture of the elevation rotary mirror 37 is set so that reflection surface of the elevation rotary mirror 37 is faced to the panoramic camera 44, and the horizontal rotating motor 20 is driven. The measuring instrument main unit 8 is rotated in horizontal direction, and the elevation rotating motor 51 is driven. The elevation rotary mirror 37 is rotated in elevation direction, and divided image data are acquired by the panoramic camera 44.

Rotation of the measurement instrument main unit 8 is detected by the horizontal angle detector 26, and rotation of the elevation rotary mirror 37 is detected by the elevation angle detector 49. A divided horizontal angle as detected by the horizontal angle detector 26 and a divided elevation angle as detected by the elevation angle detector 49 are sent to the control unit 7 respectively by feedback, and it is so controlled that the image pickup direction of the panoramic camera 44 coincides with horizontal angle and elevation angle of the image pickup range of the first image data 72 as divided (hereinafter referred as divided areas 73a to 73l).

Under the condition that the horizontal angle and the elevation angle as calculated coincide with the divided horizontal angle and the divided elevation angle as detected by the horizontal angle detector 26 and the elevation angle detector 49 respectively for each of the divided areas 73a to 73l, images of each of the divided areas 73a to 73l are taken by the panoramic camera 44.

The images thus taken from the panoramic camera 44 are stored in the storage unit 62 as digital image data to match each of the divided areas 73a to 73l.

The digital image data constitute congregation of signals of each pixel of the image photodetector 44a of the panoramic camera 44, and a signal of each pixel has a signal to specify a position (coordinate position) on the image photodetector 44a. A position on the image photodetector 44a, i.e. a field angle, is specified with respect to the image pickup optical axis 50. Further, the divided horizontal angle and the divided elevation angle of the image pickup optical axis 50 for each image are the values detected by the horizontal angle detector 26 and the elevation angle detector 49, and these are known values. Therefore, horizontal angle and elevation angle of each pixel are calculated, depending on horizontal angle and elevation angle of the image pickup optical axis 50 and on field angle of a pixel on the image photodetector 44a. Then, positions of all of the divided image data in the first image data 72 are known values, and positions of all pixels of all of the divided image data in the first image data 72 are known values. The image data stored in the storage unit 62 contain horizontal angle data and elevation angle data (address number data) of each pixel.

When image pickup operation of the image pickup range of the first image data 72 has been completed, i.e. when image pickup operation of the divided areas 73a to 73l have been completed, the first image data 72 can be acquired by synthesizing the image data of each of the divided areas 73a to 73l. Based on the first image data 72 thus acquired, a range where the measurement is performed is set up by the operation unit 55. Also, density of the measuring points in the measurement range is set up. Based on the length (height) in elevation direction of a measurement area 74 thus set up, the length in elevation direction of a detection area 75 as to be described later is set up. Also, based on height of the measurement area 74 and on density of the measuring points, scanning speed (scanning speed in elevation direction) by the laser scanner 1 and horizontal moving speed of a scanning line 76 as to be described later are calculated by the arithmetic unit 61. Specifically, the laser scanner 1 is rotated in horizontal direction at a preset speed while scanning up and down at constant speed in the measurement area 74. Also, based on horizontal moving speed of the scanning line 76, length (width) of the detection area 75 in horizontal direction is set up by the arithmetic unit 61.

Figure 5A:
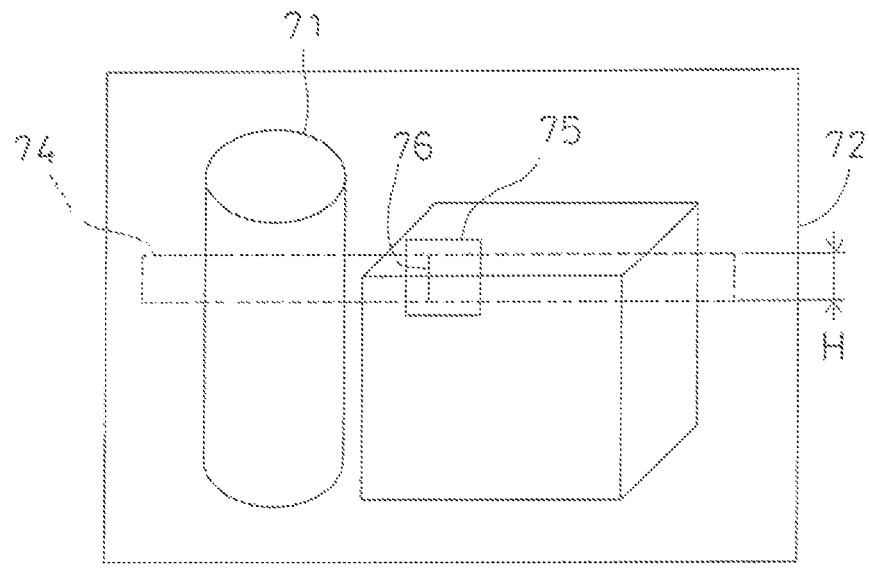
FIG. 5A and FIG. 5B are illustrative drawings to show acquisition of data in the first embodiment.
Figure 5B:
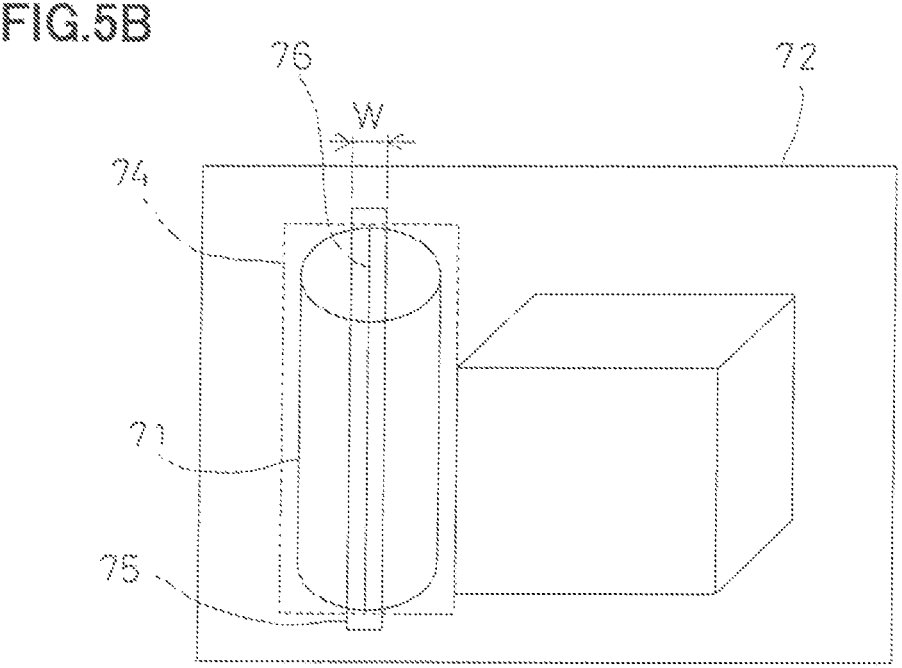
Figure 6:
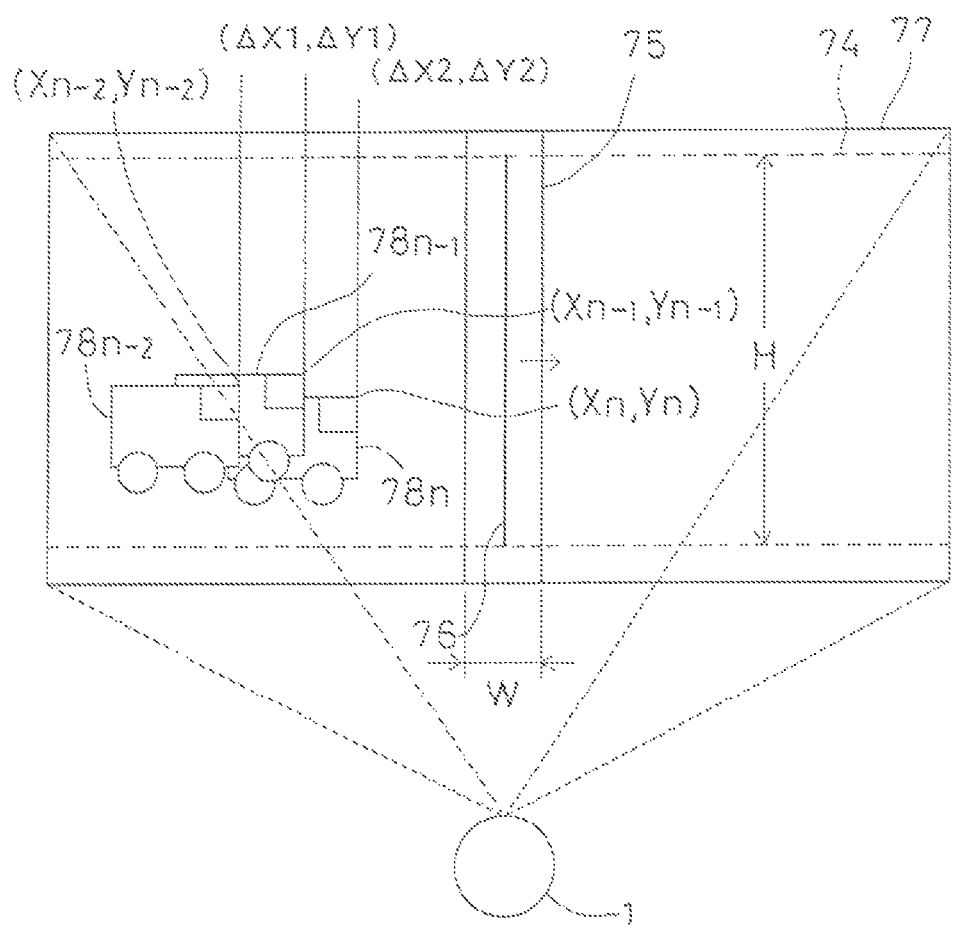
FIG. 6 is an illustrative drawing to show acquisition of data in the first embodiment.

In FIG. 5A and FIG. 5B, a symbol H represents height in elevation direction of the measurement area 74, and a symbol W represents width in horizontal direction of the detection area 75. It is supposed here that density of the measuring points in the measurement area 74 in FIG. 5A and FIG. 5B are equal to each other. FIG. 5A represents a case where horizontal moving speed of the scanning line 76 is higher, and the length of H is shorter. FIG. 5B shows a case where horizontal moving speed of the scanning line 76 is slower, and the length of the scanning line 76 is longer.

When an instruction is given from the operation unit 55 to execute distance measurement on the measurement area 74, posture of the elevation rotary mirror 37 is set up so that reflection surface of the elevation rotary mirror 37 is faced to the light emitting element 31. Then, the elevation rotating motor 51 and the horizontal rotating motor 20 are driven, and the elevation rotary mirror 37 is rotated reciprocally in elevation direction, and the measuring instrument main unit 8 is rotated in horizontal direction.

From the light emitting element 31, the distance measuring light 40 by the pulsed laser beams is projected along the projection optical axis 34 by the pulsed light emission. The distance measuring light 40 is then deflected by the elevation rotary mirror 37 and is projected to an object to be measured 71. When the distance measuring light 40 is projected by the pulsed light emission, the horizontal rotating motor 20 and the elevation rotating motor 51 are driven in synchronization. The elevation rotary mirror 37 is rotated in elevation direction, and the measuring instrument main unit 8 is rotated reciprocally in horizontal direction. As a result, the measurement area 74 is scanned over (by laser scanning) by the distance measuring light 40 (hereinafter referred as "pulsed distance measuring light 40") projected by the pulsed beams.

Here, the pulsed distance measuring light 40 is scanned over in elevation direction by the elevation rotary mirror 37, and the scanning line 76 is formed by the scanning of the pulsed distance measuring light 40. The scanning line 76 is moved in horizontal direction by rotation of the measuring instrument main unit 8. Around the scanning line 76, the detection area 75 is formed. When a mobile object enters the measurement area 74, the scanning of the entered mobile object by the pulsed distance measuring light 40 and the measurement of the mobile object are prevented by existing the detection area 75. The extent of the detection area 75 is extended or decreased to match the moving speed of the scanning line 76 so that with respect to the mobile object, which is approaching at a predetermined speed, it is possible to obtain a time of grace "T" until the mobile object reaches the scanning line 76 regardless as to from which direction the mobile object approaches.

After being reflected by the object to be measured 71, the reflected distance measuring light is deflected on the photodetection optical axis 41 by the elevation rotary mirror 37. Then, the light is condensed by the condenser lens 38 and is received by the distance measuring photodetector 39. At the distance measuring unit 4, distance measurement is performed for each pulse based on the reflected distance measuring light.

Distance data is acquired for each pulse. Also, the detected horizontal angle of the horizontal angle detector 26 and the detected elevation angle of the elevation angle detector 49 when the pulsed beam is projected are acquired at the same time. Each of the distance data is corresponded to elevation angle data and horizontal angle data and is stored in the storage unit 62. The horizontal angle related to each pixel and the horizontal angle corresponded to the distance data equally correspond. Also, since the pulsed distance measuring light 40 and the image pickup optical axis 50 coincide by rotating the elevation rotary mirror 37 at predetermined angle, the relationship between the elevation angle related to each pixel and the elevation angle corresponded to the distance data is the angle subtracting the predetermined angle from the elevation angle of the pixel.

Here, although depending on the extent of the measurement area 74, number of the distance data to be acquired is up to several millions to several tens of millions. By corresponding the distance data thus acquired to the elevation angle data and the horizontal angle data, three-dimensional point data on each of the measuring points can be acquired. Further, a multiple of point data, i.e. three-dimensional data group (point group data), included in the measurement area 74, can be acquired.

The distance measuring unit 4 and the first image pickup unit 5 are provided integrally on the measuring instrument main unit 8, and the projection optical axis 34 coincides with the image pickup optical axis 50. Because the distance measuring unit 4 and the first image pickup unit 5 are integrally rotated horizontally by the rotary mechanism unit 3, no positional deviation due to rotation occurs between the point group data and the image data. Because the horizontal angle data and the elevation angle data for each pixel of the first image data 72 correspond to the elevation angle data and the horizontal angle data, which are corresponded to the distance data of each point of the point group data, on one-to-one basis, the distance data and the first image data 72 can be promptly corresponded based on the elevation angle data and the horizontal angle data. By attaching the signals of pixels on the first image data 72 corresponding to the elevation angle data and the horizontal angle data to the point group data, three-dimensional image colored by the point group data can be acquired.

Further, in parallel with the distance measurement from the time before the starting of distance measurement on the measurement area 74 as described above, detection and evasion of the mobile object within the measurement area 74 are carried out. Now, referring to FIG. 6 and FIG. 7A to FIG. 7C, description will be given below on detection and evasion of a mobile object 78 using the laser scanner 1. Because the wide angle camera 45 is rotated integrally with the measuring instrument main unit 8, the scanning line 76 and the detection area 75 are always positioned at central portion of the second image data 77 as taken by the second image pickup unit 6. In order to more clearly define the moving of the scanning line 76, the scanning line 76 and the detection area 75 are shown by deviating in horizontal direction in FIG. 7B for convenience purpose.

By the second image pickup unit 6, the scanning line 76 in the measurement area 74, the detection area 75 formed around the scanning line 76 and the area including surrounding of the detection area 75 are taken as digital moving pictures. The digital image data are acquired as the second image data 77 at the predetermined frame intervals of the moving picture or at the predetermined time intervals, and the digital image data are stored in the storage unit 62. In case of the second image data 77, similarly to the case of the first image data 72, each signal of the pixel has a signal to specify a position (coordinate position) on an image photodetector 45$a$ of the wide angle camera 45, and positions of all pixels on the image pickup range of the second image data 77 can be specified. Width in horizontal direction of the second image data 77 may be narrower than the width in horizontal direction of the measurement area 74.

Figure 7A:
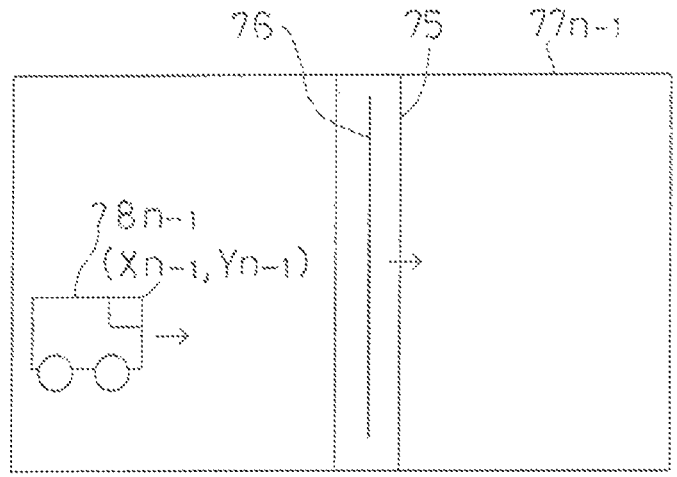
FIG. 7A, FIG. 7B and FIG. 7C are illustrative drawings to explain detection of a mobile object in the first embodiment.
Figure 7B:
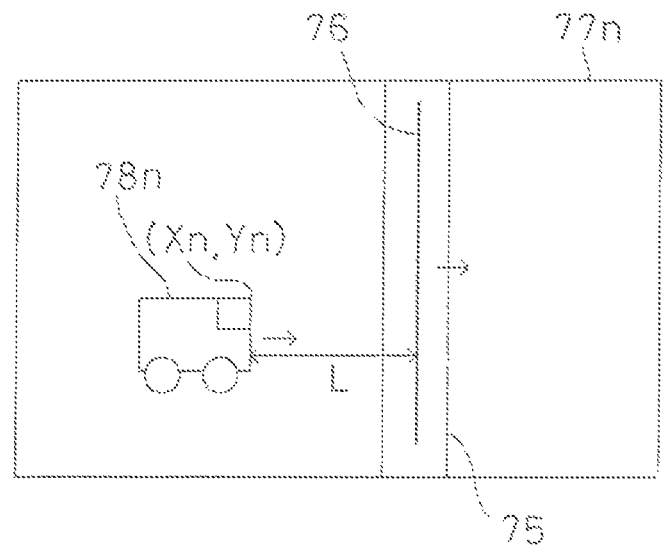
Figure 7C:
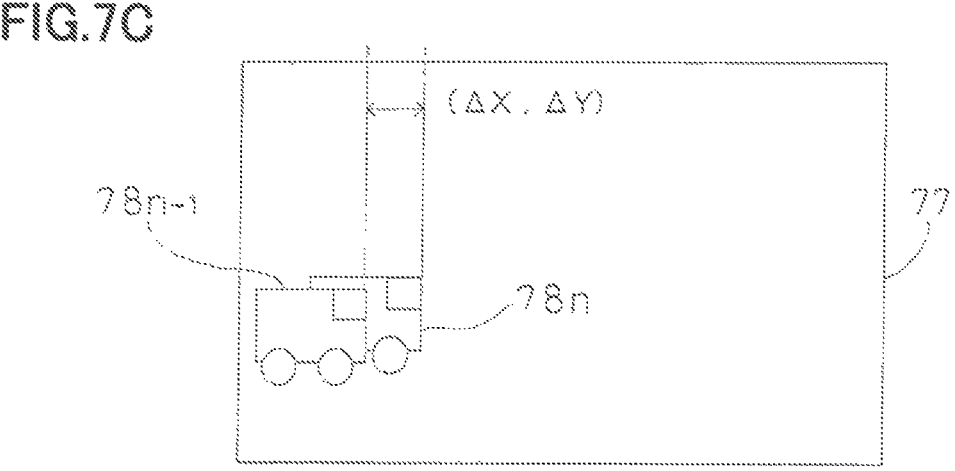

In the laser scanner 1, each time a second image data 77$n$ (n: natural number) is newly acquired as shown in FIG. 7B by the second image pickup unit 6, the second image data 77$n$ and a second image data 77$n-1$ as previously acquired as shown in FIG. 7A are compared as shown in FIG. 7C, and by calculating deviation of color information and/or deviation of brightness information for each pixel, the mobile object 78 can be detected.

When the mobile object 78 is detected, by carrying out edge processing on the second image data 77$n$ and on the second image data 77$n-1$, coordinates of the forward end (Xn, Yn) of a mobile object 78$n$ in the second image data 77$n$ and coordinates of the forward end (Xn−1, Yn−1) of a mobile object 78$n-1$ in the second image data 77$n-1$ are obtained. By calculating difference between the coordinates of the forward end of the mobile object 78$n$ and the coordinates of the forward end of the mobile object 78$n-1$, amount of displacement ($\Delta X$, $\Delta Y$) on X-axis and Y-axis, i.e. amount of moving in horizontal direction of the mobile object 78 and amount of moving in elevation direction are obtained. Then, based on the amount of displacement ($\Delta X$, $\Delta Y$), based on interval of acquisition (time interval) "t" of the second image data 77 and based on the rotating speed of the measuring instrument main unit 8, i.e. horizontal moving speed "v" of the scanning line 76, moving speed "V" of the mobile object 78 is calculated. Based on the moving speed "V" thus calculated, coordinates of the forward end of a mobile object 78$n+1$ in a second image data 77$n+1$ to be acquired subsequently is calculated.

Description will be given below on a case where the scanning line 76 is moved in rightward direction with respect to paper surface and the mobile object 78 also moves in rightward direction with respect to paper surface similarly to the scanning line 76.

In a case where the mobile object 78 is a high-speed moving object and the moving speed is very high, i.e. when $L+tV<tV$ (where symbol L represents a distance from the mobile object 78 to the scanning line 76), it is judged that the mobile object 78 reaches the scanning line 76 when the second image data 77$n$+1 of the next step has been acquired. In this case, even when the mobile object 78 is present outside the detection area 75 in the second image data 77$n$, evasion processing of the mobile object 78 is carried out without judgment by the detection area 75.

Next, referring to FIG. 8A to FIG. 8C, FIG. 9A to FIG. 9C, and FIG. 10A to FIG. 10D, description will be given on the evasion processing of the mobile object 78. As the mobile object evasion processing, in the present embodiment, mobile evasion processings of 3 patterns are set up, depending on the speed of the mobile object 78 and on detecting position of the mobile object 78, and a threshold value K of the speed of the mobile object 78 is set up in advance by the operation unit 55. The threshold value K can be set up adequately, depending on horizontal moving speed "v" of the scanning line 76, interval of acquisition "t" of the second image data 77, etc., or the threshold value K is calculated adequately for instance, so as to have the condition $K=(L+tV)/t$, depending on the horizontal moving speed "v", acquisition interval "t", distance "L" from the mobile object 78 to the scanning line 76, etc.

Now, description will be given on a case where the mobile object 78 is not a high-speed moving object and is detected within the detection area 75, and the moving speed "V" is higher than the threshold value K.

Figure 8A:
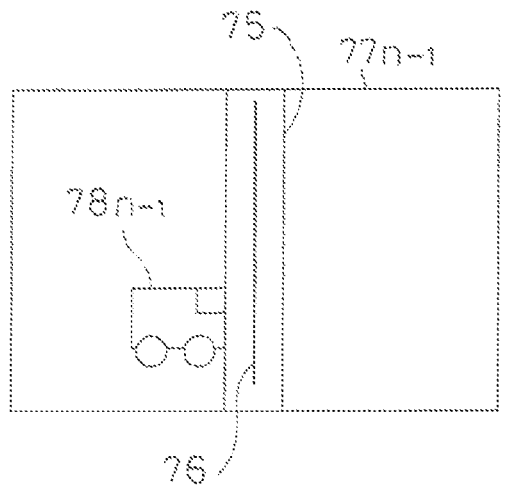
FIG. 8A, FIG. 8B and FIG. 8C are illustrative drawings to show a method for evading the mobile object in the first embodiment.
Figure 8B:
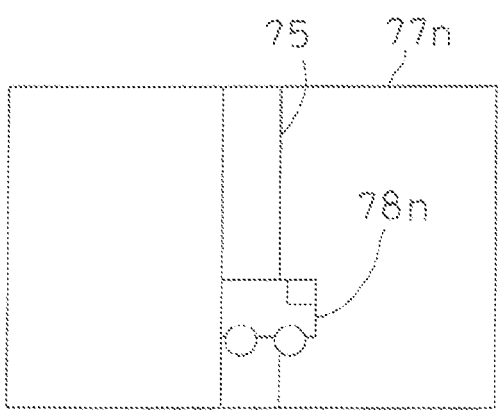
Figure 8C:
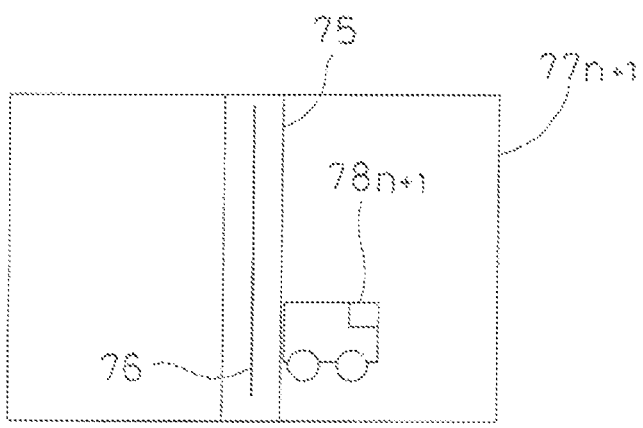

As shown in FIG. 8A, in a case where the mobile object 78$n$−1 detected in the second image data 77$n$−1 is an automobile or the like and the moving speed is higher and it is judged that the mobile object 78$n$−1 passes through the detection area 75 within short time, the measurement of the measurement area 74 by the pulsed distance measuring light 40 is temporality stopped as shown in FIG. 8B. Then, in a case where it is judged that the mobile object 78 has passed through the detection area 75, by comparing the second image data 77$n$ with the second image data 77$n$+1, the measurement of the measurement area 74 by the pulsed distance measuring light 40 can be started again as shown in FIG. 8C.

Also, in a case where the mobile object 78 as described above is a high-speed moving object, and it is judged that the mobile object 78 has reached the scanning line 76 in a stage where the second image data 77$n$+1 has been acquired although the mobile object 78 is not present within the detection area 75 in the stage of the second image data 77$n$, processing can be carried out by stopping the measurement of the measurement area 74 temporarily.

Next, description will be given on a case where the mobile object 78 is not a high-speed moving object and is detected within the detection area 75, and the moving speed "V" is lower than the threshold value K.

Figure 9A:
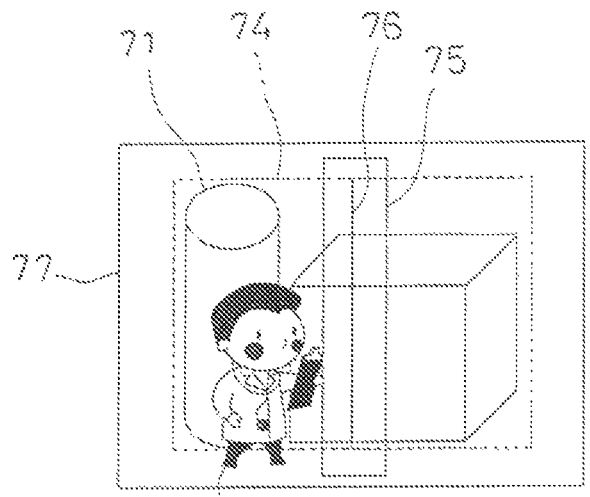
FIG. 9A, FIG. 9B and FIG. 9C are illustrative drawings to show a method for evading the mobile object in the first embodiment.
Figure 9B:
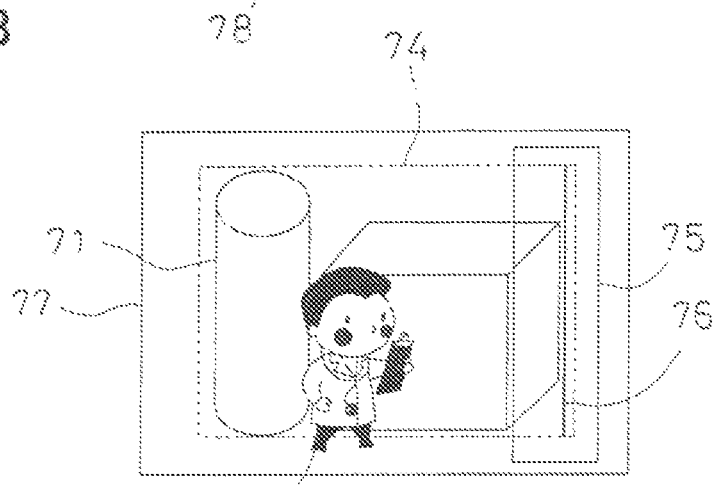

As shown in FIG. 9A, when the mobile object 78 is a pedestrian or the like and in a case where it is judged that the moving speed is slow and considerable time is required for the passing through the detection area 75, horizontal angle data and elevation angle data in its stage of the judgment are stored in memory and the measurement of the measurement area 74 by the pulsed distance measuring light 40 is interrupted. After the measurement of the measurement area 74 is interrupted, sequence of the measurement is changed, i.e. the measurement is started again from another position, the terminating end, for instance, to the starting end of the measurement area 74 as shown in FIG. 9B. Also, it may be so arranged that the sequence of the measurement is changed and an area to start again the measurement may be set up in advance when the measurement is interrupted.

In a case where the measurement is carried out from the terminating end to the starting end of the measurement area 74 and the mobile object 78 is detected within the detection area 75 again, or in a case where the measurement in the area, which is set up in advance, is completed, when the mobile object 78 is detected, the measurement of the changed sequence is terminated, and the measurement of the measurement area 74 is started again from the previously interrupted point to the terminating point based on the horizontal angle data and the elevation angle data which were stored in memory when the measurement was interrupted.

Figure 9C:
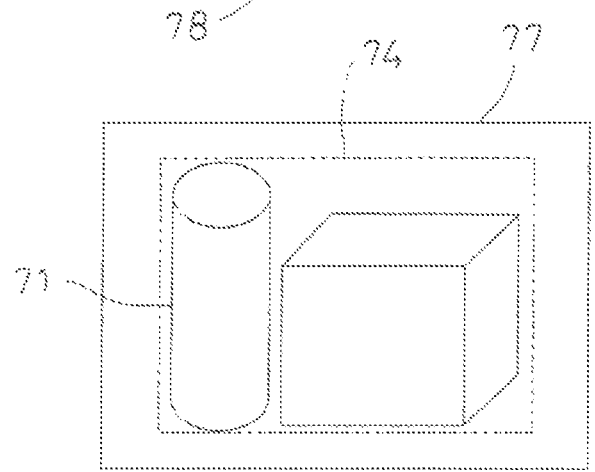

In a case where the mobile object 78 is present at a point where the measurement has been interrupted even after the measurement from another point in the measurement area 74 has been completed and the measurement of the measurement area 74 cannot be started again because the speed of the mobile object 78 is very slow or the measurement is stopped during the measuring operation or other cases, the measurement of the measurement area 74 is temporarily stopped. Further, if the measurement of the measurement area 74 cannot be started again even after a predetermined time has elapsed, the distance measurement of the measurement area 74 is stopped as shown in FIG. 9C, and a notice is displayed on the display unit 56, indicating that distance measurement of the measurement area 74 should be performed after the mobile object 78 is not present anymore.

Figure 10A:
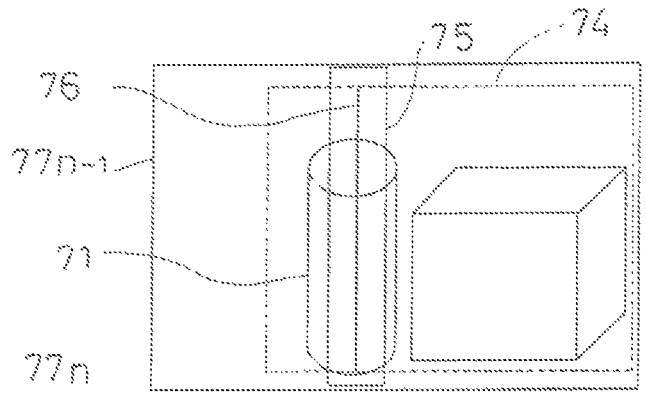
FIG. 10A, FIG. 10B, FIG. 10C and FIG. 10D are illustrative drawings to show a method for evading the mobile object in the first embodiment.
Figure 10B:
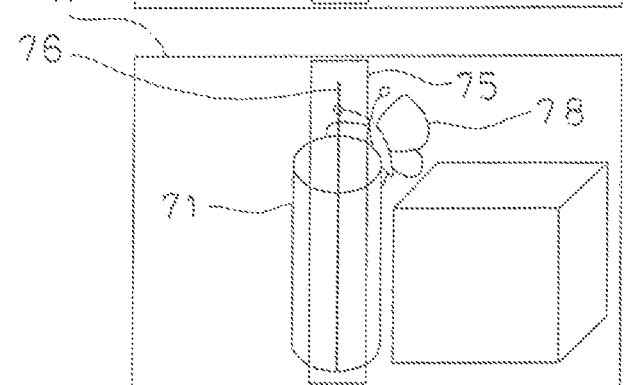
Figure 10C:
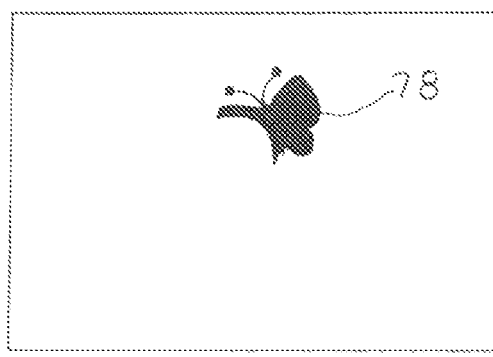
Figure 10D:
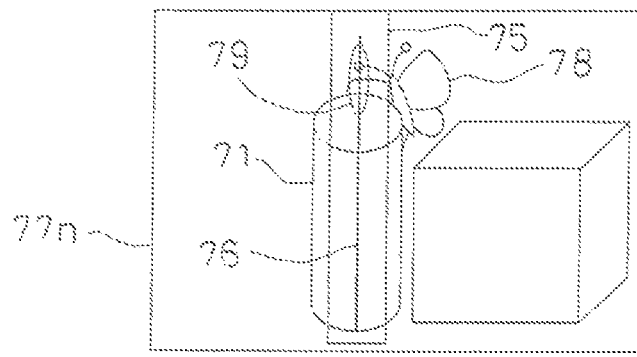

FIG. 10A shows a normal measurement condition of the measurement area 74, and shows a case where the area of the second image data 77 is larger than the area of the measurement area 74. As shown in FIG. 10B, there is a case where the mobile object 78 cannot be detected inside or outside of the detection area 75, such as a case where the mobile object 78 abruptly appears from behind the object to be measured 71 and the mobile object 78 appears on the scanning line 76. FIG. 10C shows distance data of the mobile object 78 thus acquired. In a case where the scanning has been performed on the mobile object 78 by the pulsed distance measuring light 40, the measurement of the measurement area 74 is stopped and distance data of an area 79 where the mobile object 78 has already been measured as shown in FIG. 10D is abandoned. After the distance data of the already measured area 79 is abandoned, in the stage where the mobile object 78 is not present anymore in the detection area 75, the measurement of the measurement area 74 is started again from the already measured area 79, or the measurement of the measurement area 74 is started from another point in the stage where the distance data has been abandoned.

By performing detection and evasion processing on the mobile object 78 as described above in parallel with the distance measurement of the measurement area 74 when the measurement of the measurement area 74 has been completed by the distance measuring light 40, the acquisition of the first image data 72 and the acquisition of three-dimensional data group (point group data) except noise data, are completed. That is, the three-dimensional data group except noise data which is resulted from the scanning of the mobile object 78 by the pulsed distance measuring light 40 is acquired.

Now, referring to FIG. 11, description will be given below on the acquisition of the distance data of the measurement area 74 and on the detection and evasion processing of the mobile object 78, which is carried out in parallel with the distance data acquisition processing.

First, in a pre-stage of the processing, a plurality of the divided image data are acquired by the first image pickup unit 5, and the first image data 72 are prepared by synthesizing the divided image data. Based on the first image data 72, the measurement area 74 is set up by the operation unit 55. When an instruction to execute distance measurement is inputted by the operation unit 55 after the measurement area 74 has been set up, the measurement of the measurement area 74 by the pulsed distance measuring light 40 is started.

The operator sets up the measurement area 74 by the control unit 55 via the coarse sight 53, and the measurement area 74 thus set up is divided as required. A plurality of the divided image data may be acquired by the first image pickup unit 5, and the first image data 72 may be prepared by synthesizing the divided image data. In this case, the measurement area 74 is approximately equal to the extent of the first image data 72.

(Step 01) When an instruction to execute the distance measurement is inputted, image pickup of the moving picture in the measurement area 74 is started first by the second image pickup unit 6. Then, the acquisition of the second image data 77 is started at the predetermined frame intervals or at the predetermined time intervals.

(Step 02) After the acquisition of the second image data 77 has been started, distance measurement is started on the measurement area 74 by the distance measuring unit 4.

(Step 03) When the distance measurement is started, the second image data 77$n$ (n: natural number) as acquired by the second image pickup unit 6 is compared with the second image data 77$n-1$ acquired immediately before by the second image data processing unit 68 based on color information and brightness information for each pixel.

(Step 04) As the result of the comparison between the second image data 77$n$ and the second image data 77$n-1$, it is judged that the mobile object 78 is present or not, depending on whether differences are found or not between color informations and/or between brightness informations.

(Step 05) In a case where it is judged in Step 05 that the mobile object 78 is present in Step 04, a position of the mobile object 78 is detected, and then, it is judged whether the position of the mobile object 78 is on the scanning line 76 or not.

(Step 06) When it is judged that the mobile object 78 is not present on the scanning line 76, displacement of the coordinates of the forward end of the mobile object 78 between the second image data 77$n$ and the second image data 77$n-1$, which are determined by edge detection, is acquired, and a moving speed "V" is calculated from this displacement, from the interval of acquisition "t" of the second imaged data 77, and from the horizontal moving speed "v" of the scanning line 76.

(Step 07) When the moving speed "V" of the mobile object 78 is calculated, it is judged whether the moving speed "V" of the mobile object 78 is very high or not—that is, whether the mobile object 78 is a high-speed moving object or not.

(Step 08) When it is judged that the mobile object 78 is not a high-speed moving object in Step 07, it is judged whether the detected position of the mobile object 78 is within the detection area 75 or not.

(Step 09) When it is judged in Step 08 that the mobile object 78 is not present within the detection area 75, or when it is judged in Step 04 that the object 78 is not present, normal measurement is performed on the measurement area 74 without carrying out the evasion processing on the mobile object 78.

(Step 10) In a case where it is judged in Step 05 that the position of the mobile object 78 is on the scanning line 76, distance data of the already measured area 79, which is a part of the area where the mobile object 78 has been scanned, is abandoned. After abandoning, the measuring points are changed so that measurement is started again from the already measured area 79, for which the distance data has been abandoned.

(Step 11) In a case where it is judged in Step 07 that the mobile object 78 is a high-speed moving object, the mobile object evasion processing based on the detection area 75 is not performed, and the coordinates of the forward end of the mobile object 78 in the second image data 77$n+1$ to be acquired next are calculated.

(Step 12) After the coordinates of the forward end of the mobile object 78 in the second image data 77$n+1$ have been calculated or if it is judged in Step 08 that the mobile object 78 is present within the detection area 75, it is then judged whether or not the moving speed "V" of the mobile object 78 is higher than the threshold value "K" of the speed, which has been set up in advance or which has been calculated after the acquisition of the second image data 77$n$.

(Step 13) When it is judged in Step 12 that the moving speed "V" of the mobile object 78 is higher than the threshold value K, the acquisition of the distance data is temporarily stopped so that the measurement within the measurement area 74 is started again after the mobile object 78 has passed through the detection area 75.

(Step 14) When it is judged in Step 12 that the moving speed "V" of the mobile object 78 is lower than the threshold value K, measuring points are changed so that distance data are to be acquired at the points where the mobile object 78 has not been detected, e.g. on the points from the terminating end to the starting end of the measurement area 74.

(Step 15) The processing as predetermined is performed in Step 09, Step 10, Step 13 and Step 14, and after the elapse of the acquisition time interval "t" of the second image data 77, the second image data 77$n+1$ is acquired.

(Step 16) After the second image data 77$n+1$ has been acquired, it is judged whether the procedures of the acquisition of distance data within the measurement area 74 has been completed or not. If the acquisition of the distance data is not yet completed, the procedures of Step 03 to Step 15 are repeated again. When it is judged that all procedures of the acquisition of the distance data within the measurement area 74 have been completed, the processing to acquire the distance data is terminated.

As described above, in the present embodiment, the wide angle camera 45 is provided, which is installed on the measuring instrument main unit 8 and is rotated integrally with the measuring instrument main unit 8. As a result, the acquisition of distance data with respect to the measurement area 74 and the acquisition of image data within the measurement area 74 can be performed at the same time, and image data and color data can be acquired at real time.

Also, it is so arranged that the detection of the mobile object 78 is performed in parallel with the acquisition of the distance data of the measurement area 74, and also that, when the mobile object 78 is detected, scanning of the mobile object 78 by the pulsed distance measuring light 40 is to be evaded, and in a case where the mobile object 78 has been scanned, the distance data where scanning has been performed on the mobile object 78 is to be abandoned. As a result, it is possible to prevent the intermingling of noise data, which may occur due to the scanning of the mobile object 78.

Also, it is so arranged that the detection area 75 is set up around the scanning line 76, and that, when the mobile object 78 is detected within the detection area 75, one of the following three patterns of processing are automatically performed: temporary stopping of the measurement, change of the measurement points, abandoning of the already measured distance data of the mobile object 78, depending on speed and position of the mobile object 78. Therefore, the operator has no need to monitor the measurement area 74 and the position of the mobile object 78 and to manually perform temporary stopping and re-start of the measurement so as not to prevent the intermingling of noise data in the point group data. As a result, it is possible to reduce the burden on the operator when the point group data are to be acquired.

In the present embodiment, it is so arranged that the wide angle camera 45 is installed on the measuring instrument main unit 8 and is integrally rotated with the measuring instrument main unit 8. However, in a case where the measurement area 74 is sufficiently smaller than the second image data 77, which is taken by the second image pickup unit 6, the wide angle camera 45 may be installed in fixed manner on the rotary mechanism unit 3 or the like.

In the present embodiment, the first image data 72 is prepared by synthesizing a plurality of the divided image data, and the setting of the measurement area 74 is carried out based on the first image data 72, while it may be so arranged that the image data in wider range are acquired by the second image pickup unit 6 and the measurement area 74 may be set up by the operation unit 55 based on the image data.

In the present embodiment, coloring of the point group data is performed based on the first image data 72, which is prepared by synthesizing the divided image data as taken by the first image pickup unit 5. However, the coloring of the point group data can be carried out based on the second image data 77 by corresponding the distance data of each point of the point group data to each pixel in the second image data 77. In such case, the first image pickup unit 5 may be omitted.

Also, in the present embodiment, each time the second image data 77n is acquired newly, the detection of the mobile object 78 is performed by comparing the second image data 77n with the second image data 77n−1 previously acquired. However, it may be so arranged that the first image data 72 is acquired and is used as a reference image data before the processing to acquire the distance data under the condition the mobile object 78 is not present. Also, it may be so arranged that the detection of the mobile object 78 is performed by comparing the reference image data with the newly acquired second image data 77n.

Further, when the first image data 72 is acquired, the images are taken in each of the divided areas 73a to 73l by two or more times (e.g. three times) respectively. Then, as shown in FIG. 12, differences of color information and brightness information are calculated from FIG. 12A to FIG. 12C and the mobile object 78 is deleted based on the result of calculation. As a result, reference image data 80, where the mobile object 78 is not present as shown in FIG. 12D, can be prepared automatically, and the burden on the operator can be reduced.

Figure 13:
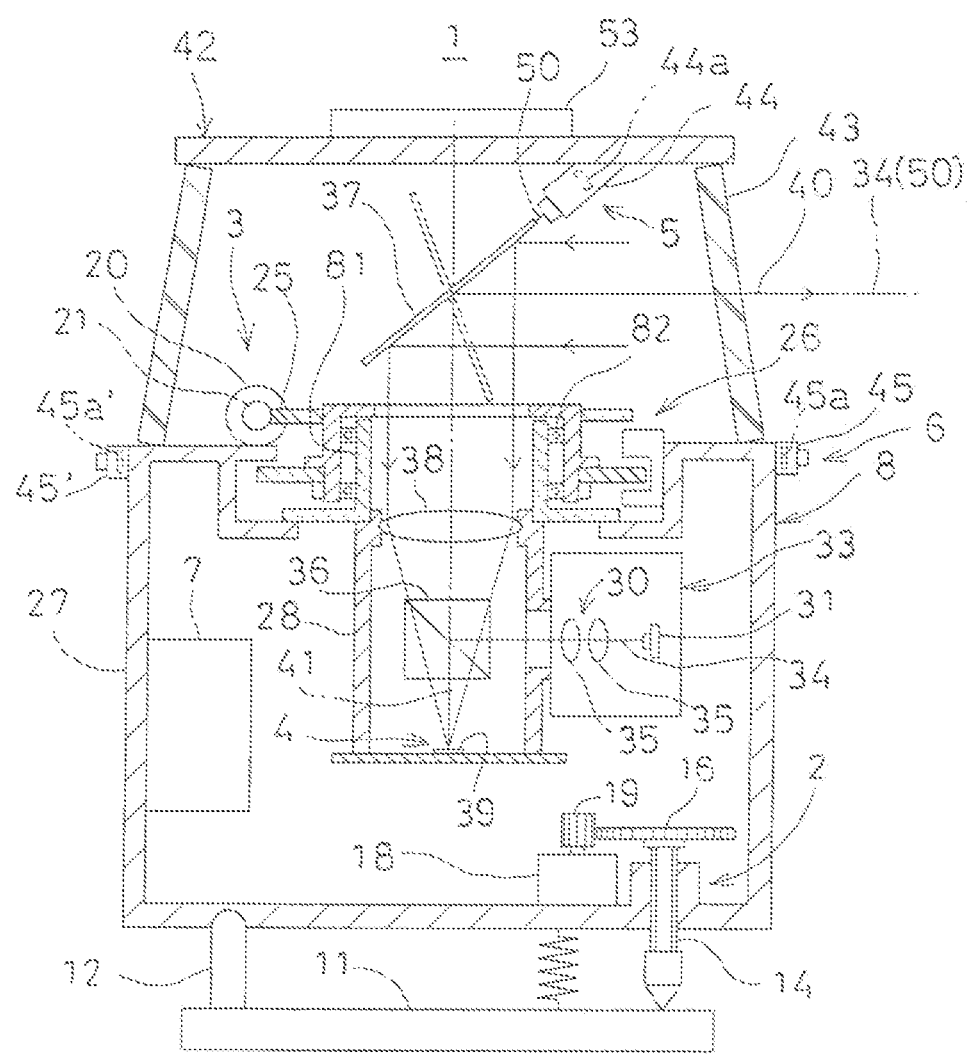
FIG. 13 is a schematical cross-sectional view of the laser scanner according to a second embodiment of the present invention.
Figure 14:
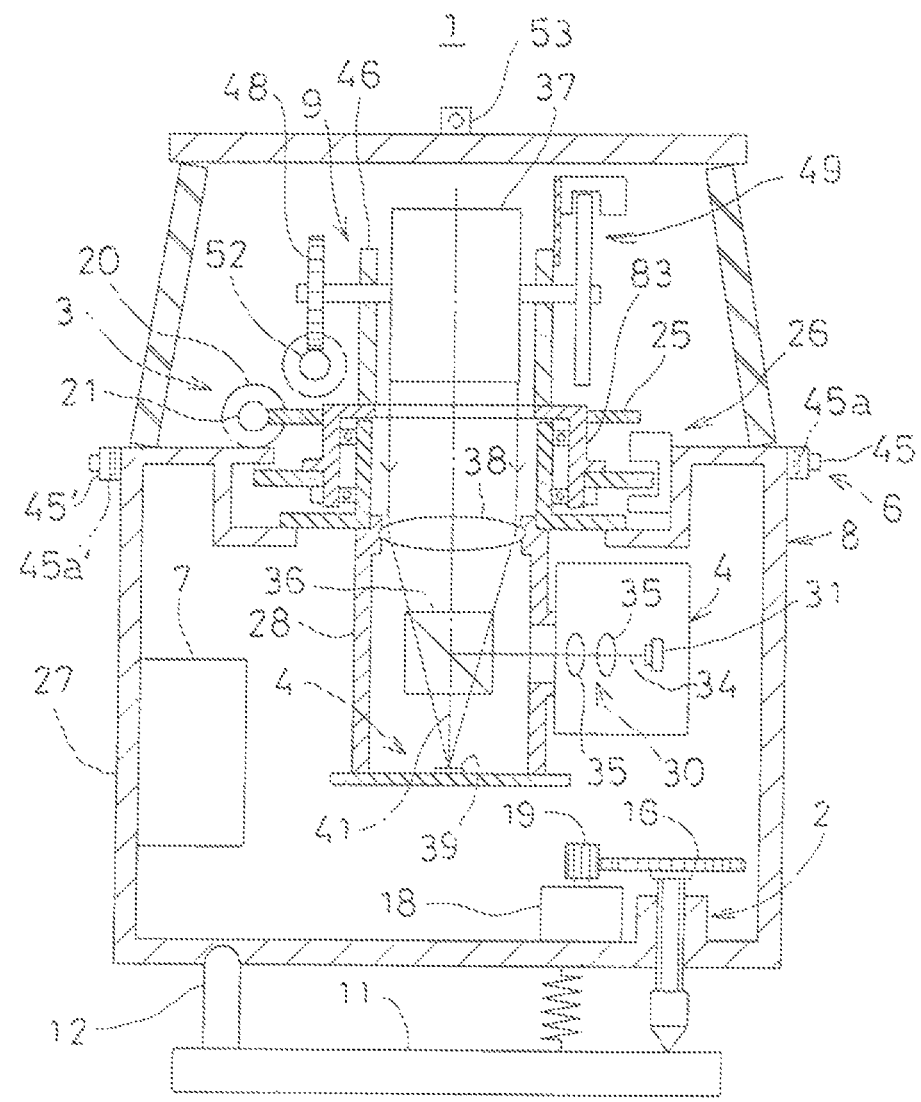
FIG. 14 is a schematical cross-sectional view of the laser scanner where a part of the laser scanner is rotated according to the second embodiment of the present invention.

Next, referring to FIG. 13 and FIG. 14, description will be given on a second embodiment of the present invention. For convenience purpose, FIG. 14 shows a condition where only a rotary projecting unit 9 is seen from lateral direction with respect to FIG. 13. In FIG. 13 and FIG. 14, the same components as shown in FIG. 1 or FIG. 2 are referred by the same symbols, and detailed description is not given.

In the second embodiment, a rotary mechanism unit 3 as used in the first embodiment is simplified so that a part of a body tube 28 is rotated. Further, over circumferential surface of a main unit casing 27, a plurality of wide angle cameras 45 are disposed over total circumference at a predetermined distance intervals from each other. In the second embodiment, too, infrared light is used as a distance measuring light 40. The wide angle cameras 45 are disposed with such distance from each other that the portions as required at both ends of the images taken by the wide angle cameras 45 and 45' adjacent to each other are overlapped on each other.

On an upper end portion of the body tube 28 where a half-mirror 36, a condenser lens 38, a distance measuring photodetector 39, etc. are accommodated, an upper end shaft portion 81 forming a part of the body tube 28 is disposed, and a rotary tube 83 is freely rotatably mounted on the upper end shaft portion 81 via a bearing 82. A mirror holder 46 is mounted on the rotary tube 83, and further, an elevation rotary mirror 37 is freely rotatably mounted on the mirror holder 46. Further, an elevation rotary driving gear 52 to rotate the elevation rotary mirror 37 is arranged, and an elevation angle detector 49 to detect the elevation angle of the elevation rotary mirror 37 is provided.

A horizontal rotary gear 25 is disposed on the rotary tube 83, and a horizontal rotating motor 20 to rotate the horizontal rotary gear 25 is mounted on upper surface of the main unit casing 27. Also, a horizontal angle detector 26 to detect rotating angle of the rotary tube 83 is arranged between the rotary tube 83 and the main unit casing 27.

In the second embodiment, a panoramic camera 44 is disposed on the mirror holder 46. In FIG. 13, the panoramic camera 44 is shown to be disposed on lower surface of the ceiling of an upper casing 42 for convenience purpose. The optical axis of the panoramic camera 44 is horizontal, and perpendicularly crosses a rotary center line of the elevation rotary mirror 37. The elevation rotary mirror 37 is rotated in elevation direction and is rotated in horizontal direction. Also, the elevation rotary mirror 37 and the panoramic camera 44 are integrally rotated in horizontal direction. A distance measuring unit 4 and a second image pickup unit 6 are fixedly mounted on a measuring instrument main unit 8.

In the second embodiment, the image pickup optical axis 50 and the distance measuring optical axis 40 are designed to coincide with a projection optical axis 34. By the rotation in elevation direction and by the rotation in horizontal direction of the elevation rotary mirror 37, surveying can be performed in the range as required, and a taken image in the direction as required can be acquired.

In the second embodiment, when the rotary tube 83 is rotated, photodetecting (light receiving) condition of a reflected distance measuring light is also rotated with respect to the distance measuring photodetector 39. Because rotation of the photodetecting condition of the reflected distance measuring light with respect to the distance measuring photodetector 39 is detected by the horizontal angle detector 26, distance data is amended based on a detecting angle of the horizontal angle detector 26.

As described above, since the arrangement of the rotary mechanism unit 3 is simplified in the second embodiment, it is possible to design the laser scanner 1 in smaller size.

Also, in the second embodiment, a plurality of wide angle cameras 45 are fixedly mounted over total circumference of the main unit casing 27. As a result, there is no need to consider the rotating speed of the measuring instrument main unit 8 when the mobile object is detected. Therefore, detection of the mobile object is easier.

The invention claimed is:

1. A laser scanner, comprising a light projecting optical system for projecting a distance measuring light along a projection optical axis, a deflecting optical member for deflecting and projecting the distance measuring light to a measurement area, an elevation angle driving unit for rotating said deflecting optical member in elevation direction, a horizontal angle driving unit for rotating said deflecting optical member in horizontal direction, a distance measuring unit for carrying out measurement based on a reflection light of the distance measuring light and for acquiring distance data of said measurement area, a first image pickup unit for taking an image via said deflecting optical member, a second image pickup unit that has a wider angle than said first image pickup unit and is capable of continuously acquiring image data including said measurement area, and a control unit, wherein said control unit has a first image processing unit for acquiring a three-dimensional image based on said image data and on said distance data, and also has a second image processing unit for detecting a mobile object by comparing image data being adjacent to each other in terms of time of the image acquired by said second image pickup unit, and said control unit controls said distance measuring unit so as to modify the measurement performed by said distance measuring unit when said mobile object is detected in said measurement area by said second image processing unit.

2. A laser scanner according to claim 1, wherein said control unit makes said distance measuring unit temporarily stop measurement of said measurement area when said mobile object is detected within said measurement area, and also makes said distance measuring unit start the measurement again after it is confirmed that said mobile object is not present within said measurement area by said second image processing unit.

3. A laser scanner according to claim 1, wherein, when said mobile object is detected within said measurement area, said control unit makes said distance measuring unit perform the measurement in said measurement area from a point where said mobile object has not been detected by said second image processing unit.

4. A laser scanner according to claim 1, wherein, when said mobile object is detected within said measurement area, said control unit abandons distance data of said mobile object measured by said distance measuring unit and makes said distance measuring unit start the measurement in said measurement area again from a point where the distance data has been abandoned.

5. A laser scanner according to claim 1, wherein said first image pickup unit acquires panoramic image data based on image data as taken by said second image pickup unit, and said measurement area is set up based on said panoramic image data.

6. A laser scanner according to claim 1, wherein said light projecting optical system has a zoom beam expander for minimizing diameter of luminous fluxes of said distance measuring light, depending on a measurement distance to said measurement area.

7. A laser scanner according to claim 1, wherein two or more panoramic image data are acquired by synthesizing two or more image data as taken by two or more times respectively by said first image pickup unit, said mobile object is detected by comparing said two or more panoramic image data with each other, and reference image data for detecting the mobile object are acquired by deleting said mobile object.

8. A laser scanner according to claim 7, wherein said mobile object is detected by comparing said reference image data with the image data as taken by said second image pickup unit.

9. A laser scanner according to one of claims 1 to 4, wherein said second image processing unit detects said mobile object by comparing image data adjacent to each other based on deviation of color information and/or brightness information.

10. A laser scanner according to one of claims 1 to 4, wherein a detection area is formed in order to perform a predetermined processing to avoid a moving object in said measurement area, and said detection area is enlarged or reduced according to distance measuring speed determined by said distance measuring unit.

11. A laser scanner according to claim 1, wherein said control unit calculates moving speed of said mobile object based on time interval of acquisition of said image data and on horizontal moving speed of said deflection optical member and restricts measurement of said mobile object by the distance measuring unit based on moving speed of said mobile object and on position of the mobile object within said measurement area.

12. A method for detecting a mobile object, comprising
setting up a measurement area,
performing measurement by a distance measuring unit based on a reflection light of a distance measuring light projected from a light projecting optical system and acquiring distance data of said measurement area,
acquiring image data by continuously taking images on said measurement area by an image pickup unit in parallel with acquiring distance data and detecting a mobile object by extracting difference between image data adjacent to each other in terms of time, and
modifying the measurement performed by said distance measuring unit when said mobile object is detected in said measurement area.

13. A method for detecting a mobile object according to claim 12, wherein said measurement area is set up based on image data as taken by a first image pickup unit via a deflection optical member.

14. A method for detecting a mobile object according to claim 12, wherein said measurement area is set up based on image data as taken by said image pickup unit.

* * * * *